(12) United States Patent
Oishi

(10) Patent No.: US 10,712,441 B2
(45) Date of Patent: Jul. 14, 2020

(54) SYNTHETIC APERTURE RADAR

(71) Applicant: MITSUBISHI ELECTRIC CORPORATION, Tokyo (JP)

(72) Inventor: Noboru Oishi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 178 days.

(21) Appl. No.: 15/765,361

(22) PCT Filed: Dec. 14, 2015

(86) PCT No.: PCT/JP2015/084923
§ 371 (c)(1),
(2) Date: Apr. 2, 2018

(87) PCT Pub. No.: WO2017/103973
PCT Pub. Date: Jun. 22, 2017

(65) Prior Publication Data
US 2018/0284261 A1    Oct. 4, 2018

(51) Int. Cl.
*G01S 13/90* (2006.01)
*G01S 7/40* (2006.01)
*G01S 7/04* (2006.01)

(52) U.S. Cl.
CPC ............... *G01S 13/90* (2013.01); *G01S 7/04* (2013.01); *G01S 7/4026* (2013.01)

(58) Field of Classification Search
CPC combination set(s) only.
See application file for complete search history.

(56) References Cited

U.S. PATENT DOCUMENTS 5,059,966 A * 10/1991 Fujisaka ............... G01S 13/87
342/195
5,384,573 A    1/1995 Turpin
(Continued)

FOREIGN PATENT DOCUMENTS

JP    2005-24311 A    1/2005
JP    4245422 B2    3/2009

OTHER PUBLICATIONS

Moreira et al., "Airborne SAR Processing of Highly Squinted Data Using a Chirp Scaling Approach with Integrated Motion Compensation", IEEE Transactions on Geoscience and Remote Sensing, Sep. 1994, vol. 32, No. 5, pp. 1029-1040.
Buckreuss S., "Motion Errors in an Airborne Synthetic Aperture Radar System", European Transactions on Telecommunications and Related Technologies, vol. 2, No. 6, Nov. 1, 1991, pp. 655-664.
Extended European Search Report dated Nov. 2, 2018 issued in corresponding European Patent Application No. 15910664.0.
(Continued)

*Primary Examiner* — Mamadou L Diallo
(74) *Attorney, Agent, or Firm* — Birch, Stewart, Kolasch & Birch, LLP

(57) ABSTRACT

Whether or not motion compensation is necessary is determined for each of received radio wave signals acquired through observation on the basis of information on a difference between an planned trajectory and an actual trajectory of a platform (103), and a motion compensation process is performed on the received radio wave signals for which the motion compensation is determined to be necessary. An image generation process is performed on the received radio wave signals on which the motion compensation process has been performed and the received radio wave signals on which the motion compensation process has not been performed depending on the results of determination, so that a SAR image of an observation object is generated.

9 Claims, 16 Drawing Sheets

(56) References Cited

U.S. PATENT DOCUMENTS

| | | | |
|---|---|---|---|
| 5,548,290 A * | 8/1996 | Sezai | G01S 13/90 342/25 A |
| 2004/0090360 A1 | 5/2004 | Vincent | |
| 2012/0050103 A1* | 3/2012 | Revol | G01S 19/21 342/357.68 |
| 2013/0113647 A1* | 5/2013 | Sentelle | G01S 13/32 342/22 |
| 2014/0285375 A1* | 9/2014 | Crain | G01S 13/885 342/25 A |
| 2014/0361921 A1* | 12/2014 | Aprile | G01S 13/9029 342/25 B |
| 2016/0084946 A1* | 3/2016 | Turbide | G01S 7/497 356/4.01 |

OTHER PUBLICATIONS

Frolind, et al. "Motion Compensation Effects in Wavelength-Resolution VHF SAR Interferometry", Geoscience and Remote Sensing, 1997, vol. 1, Aug. 3, 1997, pp. 436-438.

Pedlar, et al. "Target Geolocation Using SAR", IEE Proceedings: Radar, Sonar & Navigat, Institution of Electrical Engineers, GB, vol. 152, No. 1, Feb. 11, 2005, pp. 35-42.

Office Action dated Jul. 7, 2019 in corresponding European Patent Application No. 15 910 664.0.

Office Action dated Jan. 24, 2020 to the corresponding European Patent Application No. 15 910 664.0.

* cited by examiner

SYNTHETIC APERTURE RADAR

TECHNICAL FIELD

The present disclosure relates to synthetic aperture radars (hereinafter referred to as SAR).

BACKGROUND ART

A SAR emits pulses of radio waves repeatedly from a SAR sensor mounted on a platform to objects to be observed, and receives the radio waves that are reflected by the objects. The SAR then generates a SAR image on the basis of position information of the platform acquired when radio waves are transmitted, position information of the platform acquired when the radio waves that are reflected by an object to be observed are received, and received radio wave signals. Note that received signals of radio waves that are transmitted and received while a platform follows a trajectory that is planned (hereinafter referred to as an planned trajectory) are supposed to be used to generate a SAR image.

In a case where the platform is, for example, a flying body such as an aircraft, however, the platform may be affected by wind or the like and follow a trajectory different from the planned trajectory.

To deviate from the planned trajectory to the trajectory that the platform actually follows (hereinafter referred to as an actual trajectory) is referred to as motion, and a SAR image generated from received radio wave signals obtained when motion has occurred may be blurred. Thus, when motion has occurred, a motion compensation process is performed to make transmission/reception times of radio waves that are transmitted to an observation object and received from the observation object upon reflection, the phases of the received radio wave signals, and the like closer to values that would be obtained from the platform following the planned trajectory.

A SAR of related art performs the motion compensation process on all the signals used for generation of a SAR image to reduce blurring of the SAR image as described in Patent Literature 1, for example.

CITATION LIST

Patent Literature

Patent Literature 1: JP 2005-24311 A

SUMMARY OF INVENTION

Technical Problem

However, since the SAR of the related art described in Patent Literature 1 performs the motion compensation process on all the signals to be used for generation of a SAR image, the motion compensation process is performed also on signals that would not cause blurring in the SAR image, which is disadvantageous in that it takes extra time until generation of the SAR image.

For example, an actual platform may not only follow a trajectory different from a planned trajectory but also properly follow the planned trajectory owing to weakened influence of wind or the like. Received radio wave signals acquired while a platform follows an planned trajectory in this manner are signals for which motion compensation is unnecessary and which will not cause blurring of a SAR image. Nevertheless, in the SAR of the related art, the motion compensation process is performed also on such signals.

Further, according to the SAR of the related art, since a motion compensation process of the same content is performed on all the signals used for generation of a SAR image, there is a possibility that a motion compensation process with content that is unnecessary for some signals may be performed to result in extra time until generation of the SAR image.

For example, in a case where only the phase of one of the signals used for generation of a SAR image is shifted as compared to that of the signal acquired while the platform follows the planned trajectory, only a phase compensating process needs to be performed on this signal.

In a case where a SAR of the related art performs compensating processes on both the phases and transmission/reception times of received radio wave signals, however, the compensating process on the transmission/reception times of radio waves is also performed on signals for which only the phase compensation is needed, which results in extra time until generation of a SAR image.

Furthermore, with a SAR of the related art, there are also cases where a compensating process with a necessary content is not performed for some signals used for generation of a SAR image.

For example, in a case where the phase and the transmission/reception times of one of the received radio wave signals used for generation of a SAR image are shifted as compared to those of the signal acquired while the platform follows the planned trajectory, both of a compensating process on the phase of the received radio wave signal and a compensating process on the transmission/reception times of the radio wave are necessary for this signal.

In a case where a SAR of the related art only performs a compensating process on the phase, however, only the compensating process on the phase is also performed but a compensating process on the transmission/reception times of the radio wave is not performed on such signals as mentioned above. Blurring may still remain in a SAR image generated from such signals on which a motion compensation process with a necessary content is not performed.

Embodiments of the present disclosure have been made to solve the aforementioned problems, and an object thereof is to achieve a SAR capable of shortening the time until a SAR image with blurring reduced by motion compensation is generated.

Solution to Problem

A SAR according to the present disclosure includes a data acquiring unit, a trajectory analyzing unit, a determining unit, a motion compensating unit, and an image generating unit. The data acquiring unit acquires observation data including reception signals of radio waves that are transmitted to an observation object from a moving platform and reflected by the observation object, transmission/reception times of the radio waves, and information indicating positions and attitudes of the platform. The trajectory analyzing unit calculates information on a difference between a planned trajectory and an actual trajectory of the platform for each of the transmission/reception times of the radio waves on a basis of the observation data acquired by the data acquiring unit. The determining unit determines whether or not motion compensation is necessary for each of the reception signals of the radio waves on a basis of the information on the difference calculated by the trajectory analyzing unit. The motion compensating unit performs a motion compensation process on the reception signals of the radio waves for which motion compensation is determined to be necessary by the determining unit. The image generating unit performs an image generation process on the reception signals of the radio waves on which the motion compensation process is performed and on the reception signals of the radio waves on which the motion compensation process is not performed in accordance with a determination result obtained by the determining unit, to generate a synthetic aperture radar image of the observation object.

Advantageous Effects of Invention

According to the present disclosure, whether or not motion compensation is necessary is determined for each of received radio wave signals on the basis of information on a difference between an planned trajectory and an actual trajectory of a platform, and a motion compensation process is performed on the received radio wave signals for which motion compensation is determined to be necessary. An image generation process is performed on the received radio wave signals on which the motion compensation process has been performed and the received radio wave signals on which the motion compensation process has not be performed depending on the results of determination, so that a SAR image of the observation object is generated. This shortens the time required for motion compensation, and thus shortens the time until generation of a SAR image with blurring reduced by motion compensation.

DESCRIPTION OF EMBODIMENTS

Hereinafter, in order to explain the present disclosure in more detail, embodiments of this disclosure are described with reference to the accompanying drawings.

First Embodiment

Figure 1:
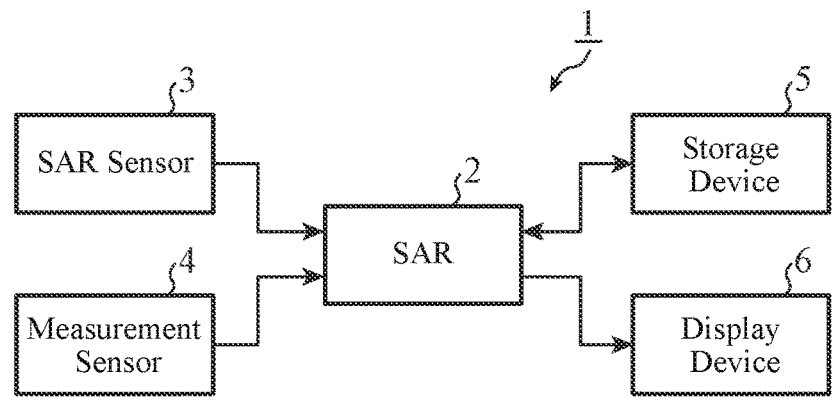
FIG. 1 is a block diagram illustrating a configuration of a SAR system including a SAR according to the present disclosure.

FIG. 1 is a block diagram illustrating a configuration of a SAR system 1 including a SAR 2 according to the present disclosure. The SAR system 1 is a system for observing the Earth's surface, a sea surface, and the like to obtain a SAR image of an object to be observed, and includes the SAR 2, a SAR sensor 3, a measurement sensor 4, a storage device 5, and a display device 6. The SAR 2 is a device for generating a SAR image of an observation object on the basis of observation data acquired by the SAR sensor 3 and the measurement sensor 4.

The SAR sensor 3 is a sensing device including a SAR antenna, a transceiver, an analog-to-digital converter, and the like, and is mounted on a platform such as an aircraft or a satellite.

The SAR sensor 3 emits pulses of radio waves generated by the transceiver into space via the SAR antenna, and receives radio waves reflected by objects to be observed that are present in the space using the SAR antenna.

The transceiver performs signal processing on a signal received by the SAR antenna, and the analog-to-digital converter converts the processed signal into digital signal to obtain a reception signal of a pulse wave.

The measurement sensor 4 is a sensing device for measuring information indicating an instantaneous position of a platform at the time when a radio wave is transmitted/received by the SAR sensor 3 and an attitude of the platform at this position. The measurement sensor 4 includes a global positioning system (GPS) receiver, a GPS antenna, and an inertial navigation system, for example. In addition, examples of information indicating the attitude of the platform include angles in roll direction, pitch direction, and yaw direction (hereinafter referred to as roll angle, pitch angle, and yaw angle), and examples of information used for calculation of position include moving velocity and acceleration.

Note that, the measurement sensor 4 is mounted on the platform together with the SAR sensor 3.

The storage device 5 is a storage device for storing information, including information necessary for processing in the SAR 2 and SAR images of observation objects generated by the SAR 2, and it is implemented as, for example, a hard disk drive. Examples of the information necessary for processing in the SAR 2 include, for example, information indicating a reference position set for each position at which a radio wave is transmitted/received by the SAR sensor 3, and reference values for various determination processes performed by the SAR 2. Note that the storage device 5 may be mounted on the platform, or may be built in a storage device included in an external device being provided at a remote location from the platform and being capable of performing data communication with the SAR 2.

The display device 6 is a display device for displaying a SAR image of observation objects generated by the SAR 2. For example, the display device 6 is implemented as a display device that is mounted on the platform or provided remotely from the platform. In a case where the display device 6 is provided remotely from the platform, a SAR image generated by the SAR 2 is transferred to the display device 6 in a wired or wireless manner.

Figure 2:
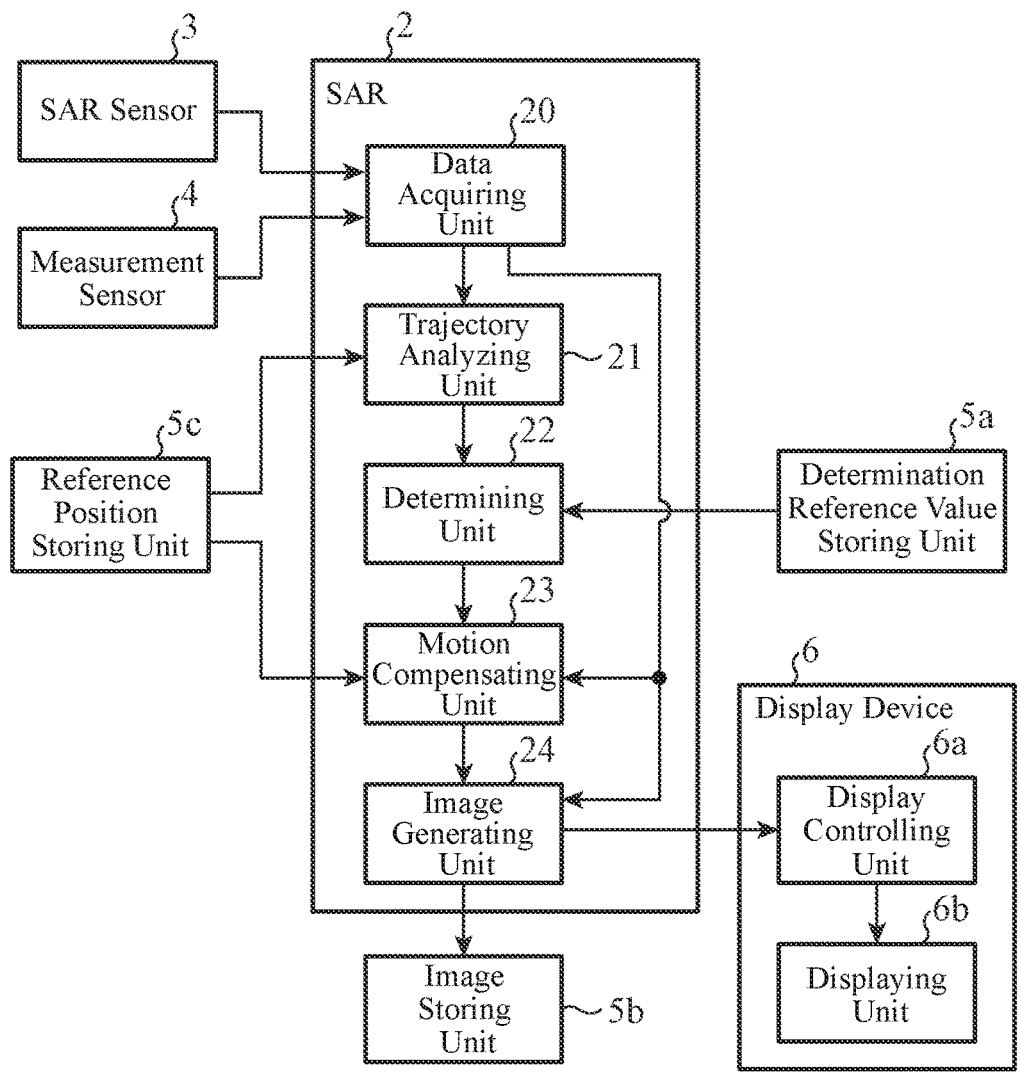
FIG. 2 is a block diagram illustrating a configuration of a SAR according to First Embodiment.

FIG. 2 is a block diagram illustrating a configuration of the SAR 2. As illustrated in FIG. 2, the SAR 2 includes a data acquiring unit 20, a trajectory analyzing unit 21, a determining unit 22, a motion compensating unit 23, and an image generating unit 24. Further, a determination reference value storing unit 5a is a storage unit in which a determination reference value to be used in a determination process of the determining unit 22 is stored. An image storing unit 5b is a storage unit in which SAR images generated by the SAR 2 are stored. A reference position storing unit 5c is a storage unit in which information indicating reference positions to be used by the trajectory analyzing unit 21 and the motion compensating unit 23 is stored. These storing units are built in storage areas in the storage device 5, for example.

The data acquiring unit 20 acquires observation data, including a reception signal of a radio wave that is transmitted to an observation object from a moving platform and reflected by the observation object, a transmission/reception time of a radio wave, and information indicating the position and attitude of the platform. For example, sensor information such as reception signals of reflected waves obtained by repeated transmission of pulse waves and reception of reflection of the pulse waves by the SAR sensor 3, a repetition period of the transmission and reception of pulse waves, and a time at which each pulse wave is transmitted or received is acquired.

The data acquiring unit 20 also acquires information indicating the position and attitude of the platform.

Examples of the information indicating the attitude of the platform include the roll angle, the pitch angle, the yaw angle, and the like of the platform, and examples of information used for calculation of position include the speed and the acceleration of the platform.

Note that the information indicating the position of the platform may be represented in an earth-fixed coordinate system or a local coordinate system specific to the platform.

Furthermore, the data acquiring unit 20 acquires observation data detected at regular intervals or at irregular intervals by the SAR sensor 3 and the measurement sensor 4.

The trajectory analyzing unit 21 calculates information on a difference between an planned trajectory and an actual trajectory of the platform on the basis of the observation data acquired by the data acquiring unit 20 for each of transmission/reception times of radio waves. The information on the difference is a distance difference between a distance from the SAR sensor 3 on the platform following an planned trajectory to a reference position and a distance from the SAR sensor 3 on the platform following an actual trajectory to the same reference position, for example.

The determining unit 22 determines whether or not motion compensation is necessary for each of the received radio wave signals on the basis of the information on the difference calculated by the trajectory analyzing unit 21.

For example, the determining unit 22 determines whether or not motion compensation is necessary for each of the received radio wave signals on the basis of the distance difference associated with each transmission/reception time of radio waves calculated by the trajectory analyzing unit 21.

The motion compensating unit 23 performs a motion compensation process on the received radio wave signals for which motion compensation is determined to be necessary by the determining unit 22. Motion compensation may be performed by a method described in the reference below, for example. Note that details of the motion compensation process will be described later.

Reference: A. Moreira and Y. Huang, "Airborne SAR Processing of Highly Squinted Data Using a Chirp Scaling Approach with Integrated Motion Compensation," IEEE Transactions on Geoscience and Remote Sensing, Volume 32, Issue 5, pp. 1029-1040, 1994.

The image generating unit 24 performs an image generation process on the received radio wave signals on which the motion compensation process has been performed and the received radio wave signals on which the motion compensation process has not been performed depending on the results of determination of the determining unit 22, to generate a SAR image of observation objects. For example, the image generating unit 24 performs the image generation process on the received radio wave signals on the basis of the received radio wave signals and information defining the planned trajectory of the platform, to generate a SAR image.

Note that, examples of the method for generating a SAR image include a chirp scaling method, an co-k method, a polar format method and a range-Doppler method, and any of which may be used.

A display controlling unit 6a controls display of information on a displaying unit 6b of the display device 6. In addition, the displaying unit 6b is a display main unit of the display device 6. For example, a SAR image input from the image generating unit 24 is displayed on the displaying unit 6b by the display controlling unit 6a.

While a case where the display device 6 includes the display controlling unit 6a is illustrated in FIG. 2, a configuration in which the SAR 2 includes the display controlling unit 6a may alternatively be used.

Figure 3A:
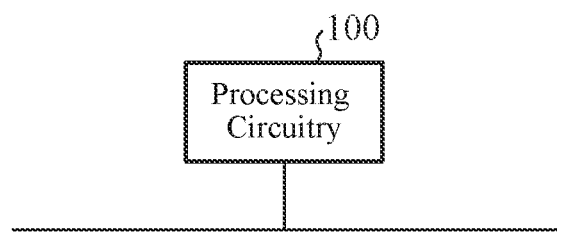
FIG. 3A is a block diagram illustrating a hardware configuration implementing the functions of the SAR.
Figure 3B:
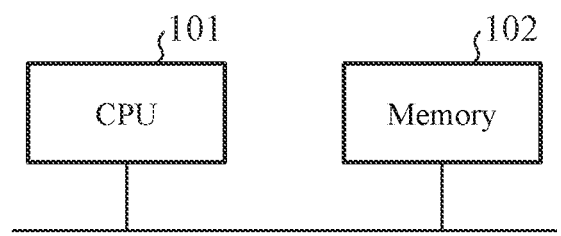
FIG. 3B is a block diagram illustrating a hardware configuration for executing software implementing the functions of the SAR.

FIG. 3A is a block diagram illustrating a hardware configuration for implementing the functions of the SAR 2, and FIG. 3B is a block diagram illustrating a hardware configuration for executing software implementing the functions of the SAR 2.

The functions of the data acquiring unit 20, the trajectory analyzing unit 21, the determining unit 22, the motion compensating unit 23, and the image generating unit 24 in the SAR 2 are implemented by processing circuitry.

Figure 4:
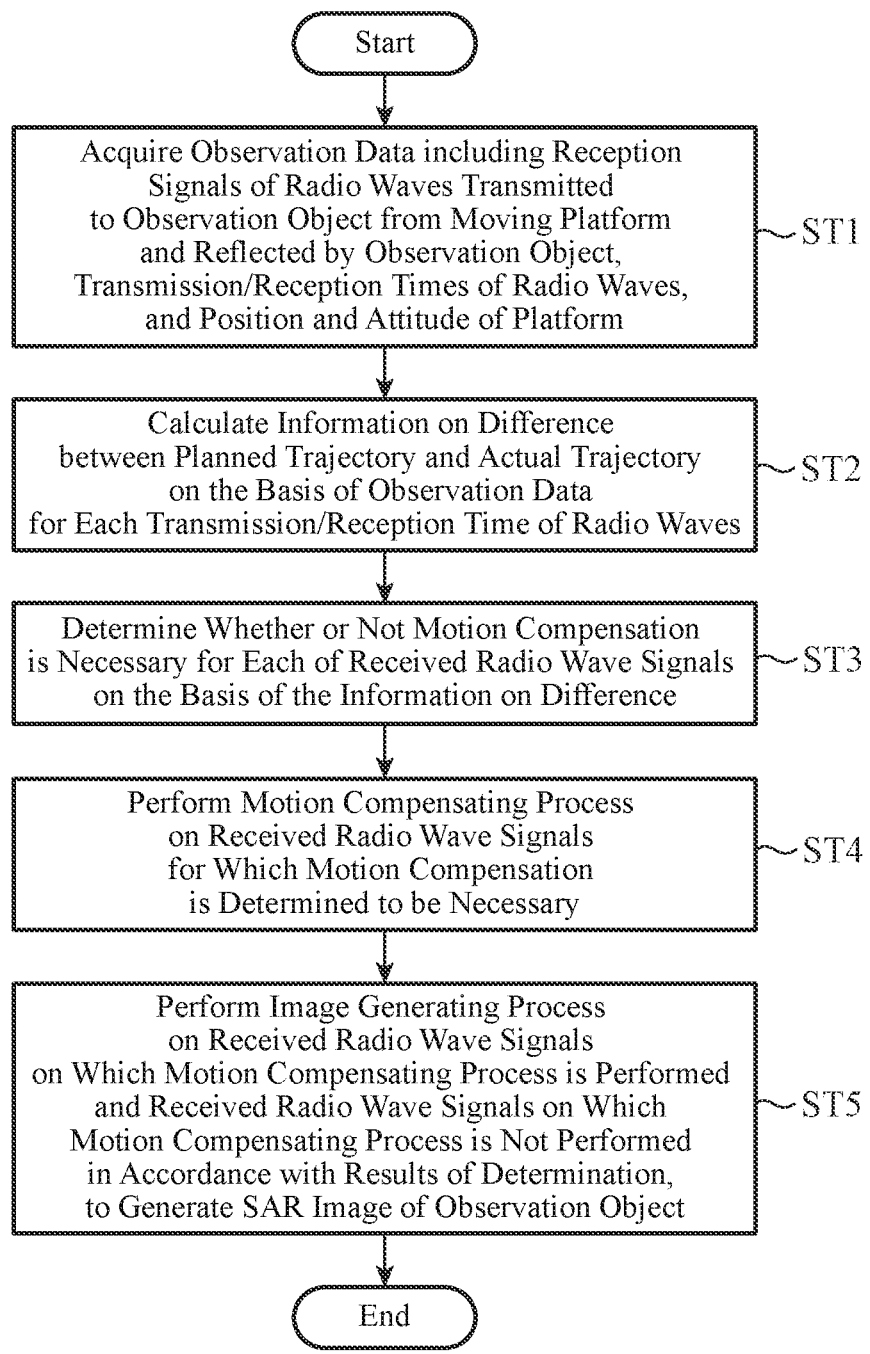
FIG. 4 is a flowchart illustrating operation of the SAR according to First Embodiment.

Specifically, the SAR 2 includes the processing circuitry for sequentially performing step ST1 of acquiring the observation data, step ST2 of calculating information on a difference between an planned trajectory and an actual trajectory for each of transmission/reception times of radio waves on the basis of the observation data, step ST3 of determining whether or not motion compensation is necessary for each of the received radio wave signals on the basis of the information on the difference, step ST4 of performing the motion compensation process on the received radio wave signals for which motion compensation is determined to be necessary, and step ST5 of performing the image generation process on the received radio wave signals on which the motion compensation process has been performed and the received radio wave signals on which the motion compensation process has not been performed depending on the determination results to generate a SAR image of the observation object, as illustrated in FIG. 4. The processing circuitry may be dedicated hardware, or a central processing unit (CPU) for reading and executing programs stored in a memory.

In a case where the processing circuitry is processing circuitry 100 that is dedicated hardware as illustrated in FIG. 3A, the processing circuitry 100 may be a single circuit, a composite circuit, a programmed processor, a parallel-programmed processor, an application specific integrated circuit (ASIC), a field-programmable gate array (FPGA), or a combination thereof, for example. In addition, the functions of the data acquiring unit 20, the trajectory analyzing unit 21, the determining unit 22, the motion compensating unit 23, and the image generating unit 24 may be implemented by respective processing circuits, or the functions of the respective units may be collectively implemented by one processing circuit.

In a case where the processing circuitry is a CPU 101 as illustrated in FIG. 3B, the functions of the data acquiring unit 20, the trajectory analyzing unit 21, the determining unit 22, the motion compensating unit 23, and the image generating unit 24 are implemented by software, firmware, or combination of software and firmware.

The software and firmware are described in the form of programs and stored in a memory 102. The CPU 101 implements the functions of the respective units by reading and executing the programs stored in the memory 102. Thus, the SAR 2 includes the memory 102 for storing programs, which, when executed by the CPU 101, results in execution of the processes in steps ST1 to ST5 described above.

These programs cause a computer to execute the procedures or the methods of the data acquiring unit 20, the trajectory analyzing unit 21, the determining unit 22, the motion compensating unit 23, and the image generating unit 24.

Note that examples of the memory include a nonvolatile or volatile semiconductor memory such as a random access memory (RAM), a ROM, a flash memory, an erasable programmable ROM (EPROM), or an electrically EPROM (EEPROM), a magnetic disk, a flexible disk, an optical disk, a compact disc, a mini disc, or a digital versatile disk (DVD), for example.

Alternatively, some of the functions of the data acquiring unit 20, the trajectory analyzing unit 21, the determining unit 22, the motion compensating unit 23, and the image generating unit 24 may be implemented by dedicated hardware, and others may be implemented by software or firmware.

For example, the functions of the data acquiring unit 20 are implemented by the processing circuitry 100 that is dedicated hardware, and the functions of the trajectory analyzing unit 21, the determining unit 22, the motion compensating unit 23, and the image generating unit 24 are implemented by the CPU 101 executing the programs stored in the memory 102.

As described above, the processing circuitry is capable of implementing the above-described functions by hardware, software, firmware, or combination thereof.

Next, operation will be explained.

Figure 5:
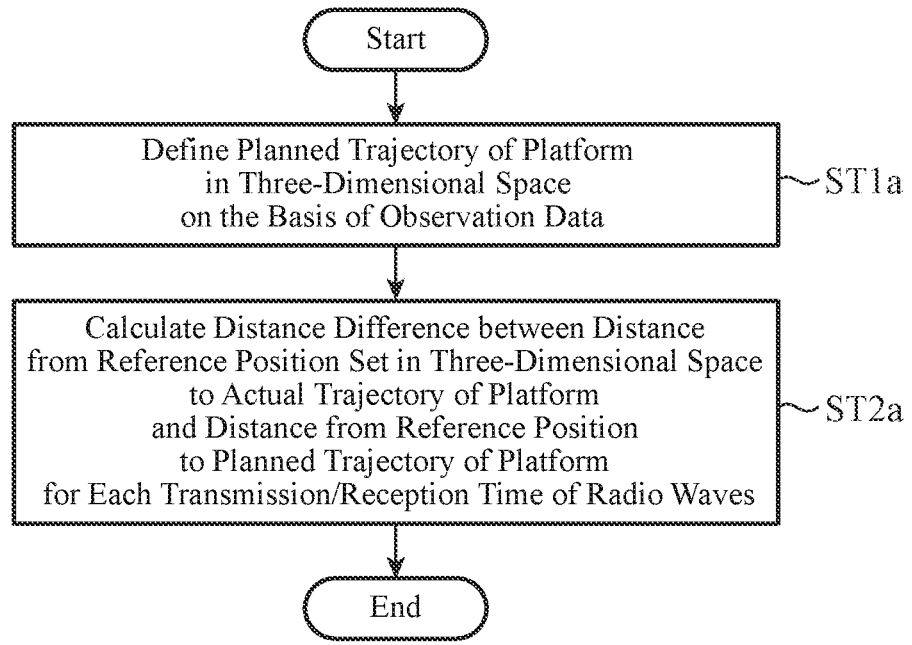
FIG. 5 is a flowchart illustrating concrete processing of step ST2 in FIG. 4.

FIG. 5 is a flowchart illustrating concrete processing of step ST2 in FIG. 4.

Figure 6:
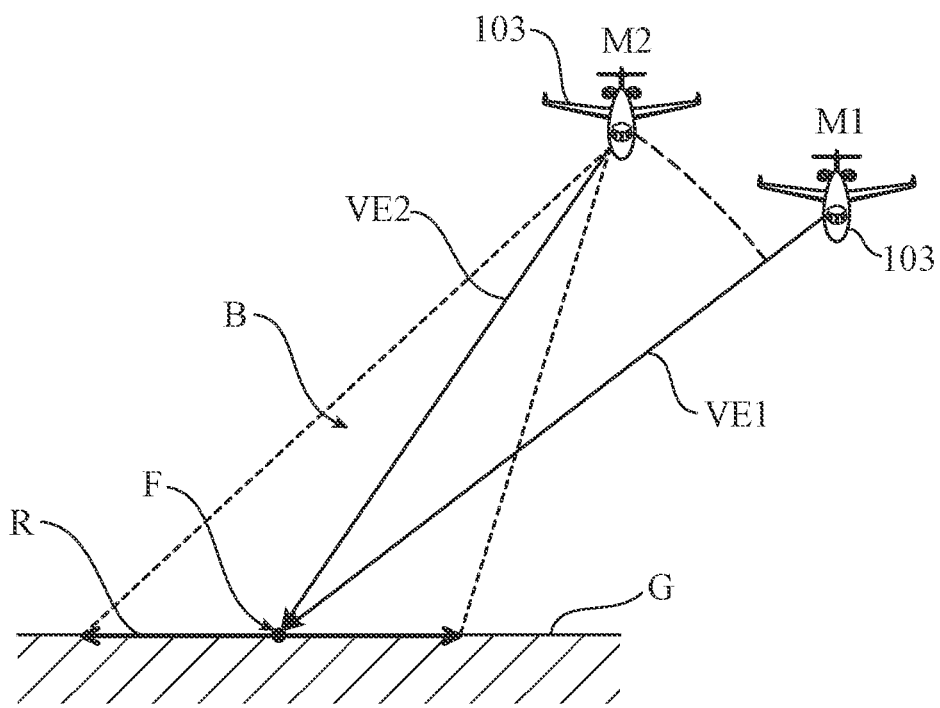
FIG. 6 is a diagram illustrating observation geometry of the SAR system.

In addition, FIG. 6 is a diagram illustrating observation geometry of the SAR system 1, which illustrates a case where the earth's surface G is observed from the platform 103 that is an aircraft.

In FIG. 6, both of the platform 103 following a planned trajectory M1 and the platform 103 following an actual trajectory M2 are illustrated. The SAR sensor 3 mounted on the platform 103 emits radio wave pulses toward the Earth's surface G while scanning in a range direction perpendicular to the travelling direction of the platform 103. As a result, an observing antenna beam B with an observation range R is formed.

Operation of the trajectory analyzing unit 21 will now be explained with reference to the observation geometry in FIG. 6.

The trajectory analyzing unit 21 defines the planned trajectory M1 to be used for image generation in a three-dimensional space on the basis of, among the observation data, the transmission/reception times of radio waves transmitted and received as pulse waves by the SAR sensor 3 and information indicating the position and attitude of the platform 103 (step ST1$a$).

Note that the planned trajectory M1 varies depending on processing in the image generation process; the planned trajectory M1 is hereinafter assumed to be a linear trajectory.

As a method for defining a linear trajectory in a three-dimensional space, for example, it is conceivable that the actual trajectory M2 determined by the observation data is linearly fitted.

The trajectory analyzing unit 21 defines transmission/reception positions of radio wave pulses at regular intervals on the linear trajectory obtained by the linear fitting, and calculates information indicating spatial coordinates and the attitude of the platform 103 at the transmission/reception positions of the pulse waves.

For such intervals between the transmission/reception positions of the pulse waves defined on the planned trajectory M1, a value obtained by averaging the intervals between the transmission/reception positions of the radio wave pulses on the actual trajectory M2 may be used or the minimum value of the intervals between the transmission/reception positions of the radio wave pulses on the actual trajectory M2 may be used.

Note that, in the present disclosure, the planned trajectory M1 may be defined using a method other than that described above as long as the planned trajectory M1 and the actual trajectory M2 can be defined in the same three-dimensional space.

Subsequently, the trajectory analyzing unit 21 calculates a distance difference between the distance from a reference position F set in the three-dimensional space to the actual trajectory M2 and the distance from the reference position F to the planned trajectory M1 for each of transmission/reception times of the radio wave pulses (step ST2$a$). Note that the reference position F is a position of an observation reference, and may be set to different positions for different radio wave pulses or may be set to one position for all the pulse waves transmitted and received by the SAR sensor 3. Alternatively, a plurality of reference positions F may be defined for one pulse wave.

Furthermore, the place where the reference position F is defined may be the ground G, or may be positions higher or lower than the ground G or outside of the observation range R.

The distance difference can be calculated from the positional relation of the planned trajectory M1 and the actual trajectory M2, which are determined by the observation data, and the reference position F. Alternatively, the distance difference may be calculated as follows.

In FIG. 6, a line-of-sight direction vector VE1 is converted into a unit vector that originates from the SAR sensor 3 of the platform 103 travelling the planned trajectory M1 toward the reference position F.

In addition, a vector VE2 represents a vector connecting the SAR sensor 3 of the platform 103 travelling the actual trajectory M2 and the reference position.

In this case, the distance difference is calculated as an inner product of the vector VE2 and such line-of-sight direction vector VE1.

Next, details of the determination process performed by the determining unit 22 will be described.

Figure 7:
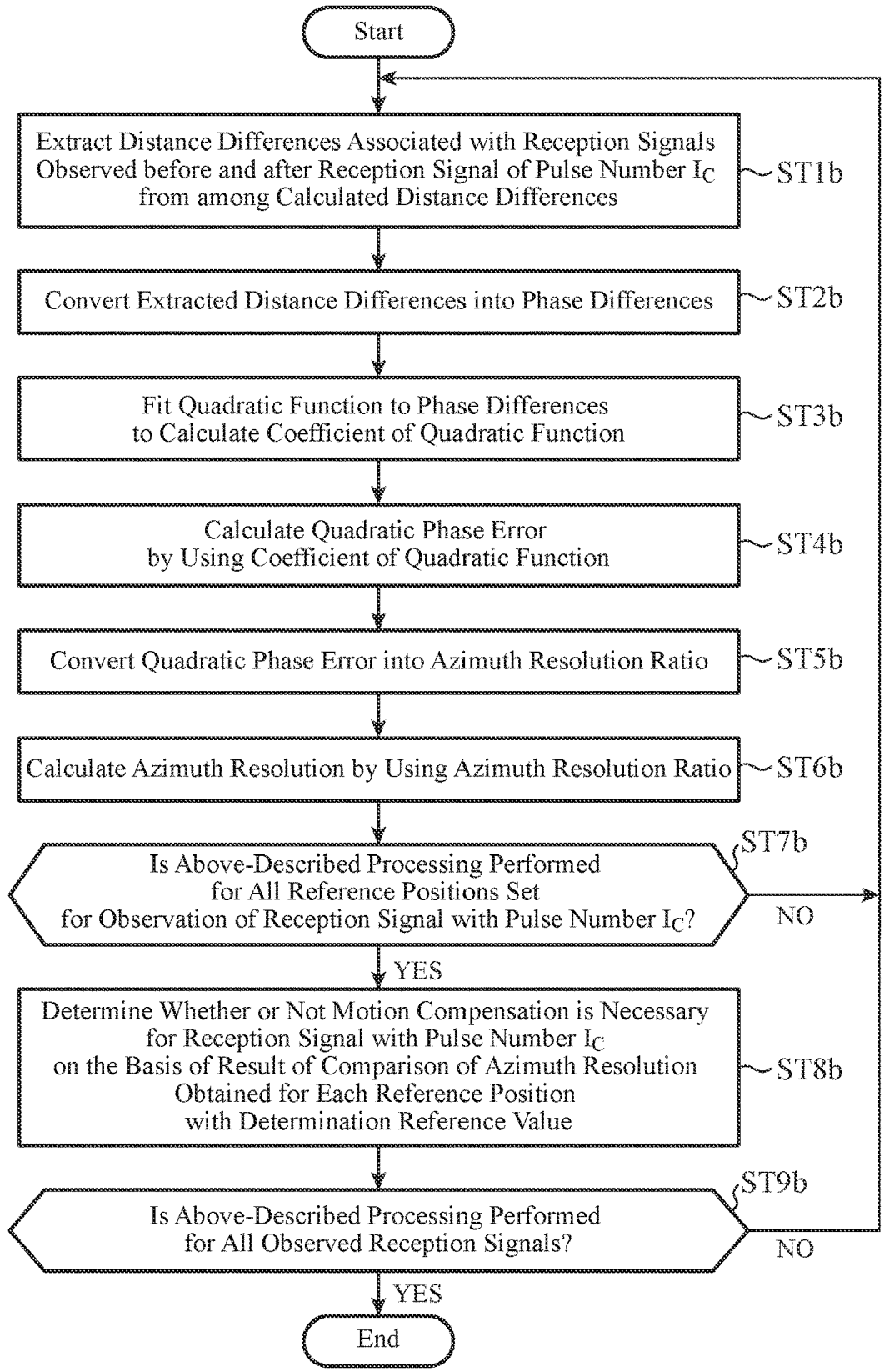
FIG. 7 is a flowchart illustrating concrete processing of step ST3 in FIG. 4.

FIG. 7 is a flowchart illustrating concrete processing of step ST3 in FIG. 4.

First, the determining unit 22 extracts distance differences associated with reception signals observed before and after a reception signal with pulse number $I_C$ from among the distance differences calculated by the trajectory analyzing unit 21 (step ST1b).

For example, a pulse number I is assigned to each of the radio wave pulses transmitted/received by the SAR sensor 3, and the pulse number of the pulse wave corresponding to the received radio wave signal to be determined is represented by $I_C$.

In this case, distance differences associated with received radio wave signals whose pulse number I satisfies $|I-I_C| \le N_{SA}/2$ are extracted. Note that the number of synthetic aperture points $N_{SA}$ is the number of integration points in the image generation process, which is calculated using Expression (1) below.

In the expression, $R_0$ represents the distance to an observation center, V represents the speed of the platform, $T_{PRI}$ represents a pulse repetition period, and $\lambda$ represents a wavelength of a radio wave transmitted as a pulse wave by the SAR sensor 3.

In addition, $\Delta a$ represents an azimuth resolution of a SAR image that is not blurred (defocused), that is a resolution in the travelling direction of the platform 103 in the SAR image.

$$N_{SA}=(2R_0/VT_{PRI})\tan(\lambda/4\Delta a) \qquad (1)$$

Subsequently, the determining unit 22 converts the distance differences extracted in step ST1b into phase differences (step ST2b). For example, when a distance difference associated with a received radio wave signal with pulse number I is represented by r(I) and a phase difference into which the distance difference r(I) is converted is represented by $\varphi(I)$, the phase difference $\varphi(I)$ can be calculated in accordance with the following Expression (2).

$$\varphi(I)=4\pi r(I)/\lambda \qquad (2)$$

Subsequently, the determining unit 22 performs quadratic function fitting on a phase difference $\varphi(I)$ obtained for each received radio wave signal with pulse number I in step ST2b to obtain a coefficient of a quadratic function (step ST3b). Examples of a method for the fitting include the least squares method.

Here, a result of the fitting as expressed in Expression (3) below is obtained. In the expression, $A_2$ represents a coefficient of a quadratic function, $A_1$ represents a coefficient of a linear function, $A_0$ represents a constant, and t represents time period from the transmission/reception time with pulse number $I_C$ as an origin.

$$A_2 t^2 + A_1 t + A_0 \qquad (3)$$

In step ST4b, the determining unit 22 calculates a reference value for a phase error called quadratic phase error from the coefficient of the quadratic function obtained by the quadratic function fitting. The quadratic phase error $E_\varphi$ can be calculated using Expression (4) below. In the expression, $T_{SA}$ represents a synthetic aperture time, which is expressed by $T_{SA}=N_{SA}T_{PRI}$.

$$E_\varphi = A_2(T_{SA}/2)^2 \qquad (4)$$

Subsequently, the determining unit 22 converts the quadratic phase error $E_\varphi$ into an azimuth resolution ratio (step ST5b). The azimuth resolution ratio is a ratio of the azimuth resolution when blurring is present in SAR image due to the quadratic phase error $E_\varphi$ to the azimuth resolution when no blurring is present in SAR image.

For example, the azimuth resolution ratio is 1.00 when the quadratic phase error $E_\varphi$ is 0 (rad), and the azimuth resolution ratio is 1.01 when the quadratic phase error $E_\varphi$ is $\pi/4$ (rad).

Further, the azimuth resolution ratio is 1.06 when the quadratic phase error $E_\varphi$ is $\pi/2$ (rad), and the azimuth resolution ratio is 1.20 when the quadratic phase error $E_\varphi$ is $3\pi/4$ (rad). In this manner, the azimuth resolution ratio can be uniquely determined with respect to the quadratic phase error $E_\varphi$.

Thus, by using the relation between the quadratic phase error $E_\varphi$ and the azimuth resolution ratio, a quadratic phase error $E_\varphi$ can be converted into an azimuth resolution ratio.

An example of methods for the conversion may be using a conversion formula obtained by polynomial fitting of the relation between the quadratic phase error $E_\varphi$ and the azimuth resolution ratio.

Alternatively, an association table of the quadratic phase error $E_\varphi$ and the azimuth resolution ratio may be provided, and an azimuth resolution ratio associated with a value closest to the quadratic phase error $E_\varphi$ in the association table may be used as a conversion result.

Subsequently, the determining unit 22 calculates, for each reference position F, an azimuth resolution when blurring is present in SAR image due to the quadratic phase error $E_\varphi$ by using the azimuth resolution ratio converted from the quadratic phase error $E_\varphi$ in step ST5b (step ST6b).

For example, the azimuth resolution when blurring is present in SAR image is obtained by multiplying the azimuth resolution ratio by the azimuth resolution $\Delta a$ when no blurring is present in SAR image.

In step ST7b, the determining unit 22 checks whether or not the above-described processing has been performed for all the reference positions F associated with the received radio wave signal with pulse number $I_C$.

If a reference position F for which the processing has not been performed is present (step ST7b; NO), the process returns to step ST1b and the above explained processing is performed. If the processing has been performed for all the reference positions F (step ST7b; YES), the process proceeds to processing in step ST8b.

In step ST8b, the determining unit 22 determines whether or not motion compensation is necessary for the received radio wave signal with pulse number $I_C$ on the basis of a result of comparison of the azimuth resolution of the SAR image that is blurred with a determination reference value read from the determination reference value storing unit 5a. Note that the number of calculated azimuth resolution values of the SAR image that is blurred corresponds to the number of reference positions F set for each received radio wave signal with pulse number I. Thus, the azimuth resolution to be compared with the determination reference value may be the maximum or average value of the azimuth resolutions associated with all the reference positions F set for the received radio wave signal with pulse number $I_C$.

For example, in a case where an upper limit of the azimuth resolution of the SAR image that is blurred is set as the determination reference value, the determining unit 22 compares the maximum value of the azimuth resolutions associated with all the reference positions F described above with the determination reference value (the upper limit of the azimuth resolution). In this case, when the maximum value of the azimuth resolution is larger than the determination reference value, the determining unit 22 determines that the azimuth resolution is degraded by the motion of the platform 103 and thus determines that motion compensation of the received radio wave signals with the pulse numbers $I_C$ is necessary. In contrast, when the maximum value of the azimuth resolution is not larger than the determination reference value, the determining unit 22 determines that the azimuth resolution is not degraded by the motion of the platform 103, and thus determines that motion compensation of the received radio wave signals with the pulse numbers $I_C$ is unnecessary.

Thereafter, the determining unit 22 checks whether or not the above-described processing has been performed for all the received radio wave signals that have been observed (step ST9b). If a received radio wave signal that has not been processed is present (step ST9b; NO), the determining unit 22 returns to step ST1b and performs the processing on the received radio wave signal that has not been processed. If the processing has been performed for all the received radio wave signals (step ST9b; YES), the determining unit 22 terminates the processing.

Whether or not motion compensation of a received radio wave signal is necessary is determined on the basis of the result of comparison of the azimuth resolution of the SAR image that is blurred obtained in step ST6b with the determination reference value in FIG. 7, but this is a non-limiting embodiment.

For example, when any one of the coefficient of the quadratic function in step ST3b, the quadratic phase error in step ST4b, the azimuth resolution ratio in step ST5b, and the azimuth resolution of the SAR image that is blurred in step ST6b is determined, the other of these values can be calculated from the determined value. Thus, any of the coefficient of the quadratic function, the quadratic phase error, and the azimuth resolution ratio may be compared with the determination reference value.

In a case where a coefficient of the quadratic function is compared with a determination reference value, the determination reference value in step ST8b is a value relating to coefficient of the quadratic function, and the processing from step ST4b to step ST6b can be omitted. In a case where a quadratic phase error is compared with a determination reference value, the determination reference value in step ST8b is a value relating to quadratic phase error, and the processing from step ST5b to step ST6b can be omitted. Similarly, in a case where an azimuth resolution ratio is compared with a determination reference value, the determination reference value in step ST8b is a value relating to azimuth resolution ratio, and the processing in step ST6b can be omitted.

Figure 8:
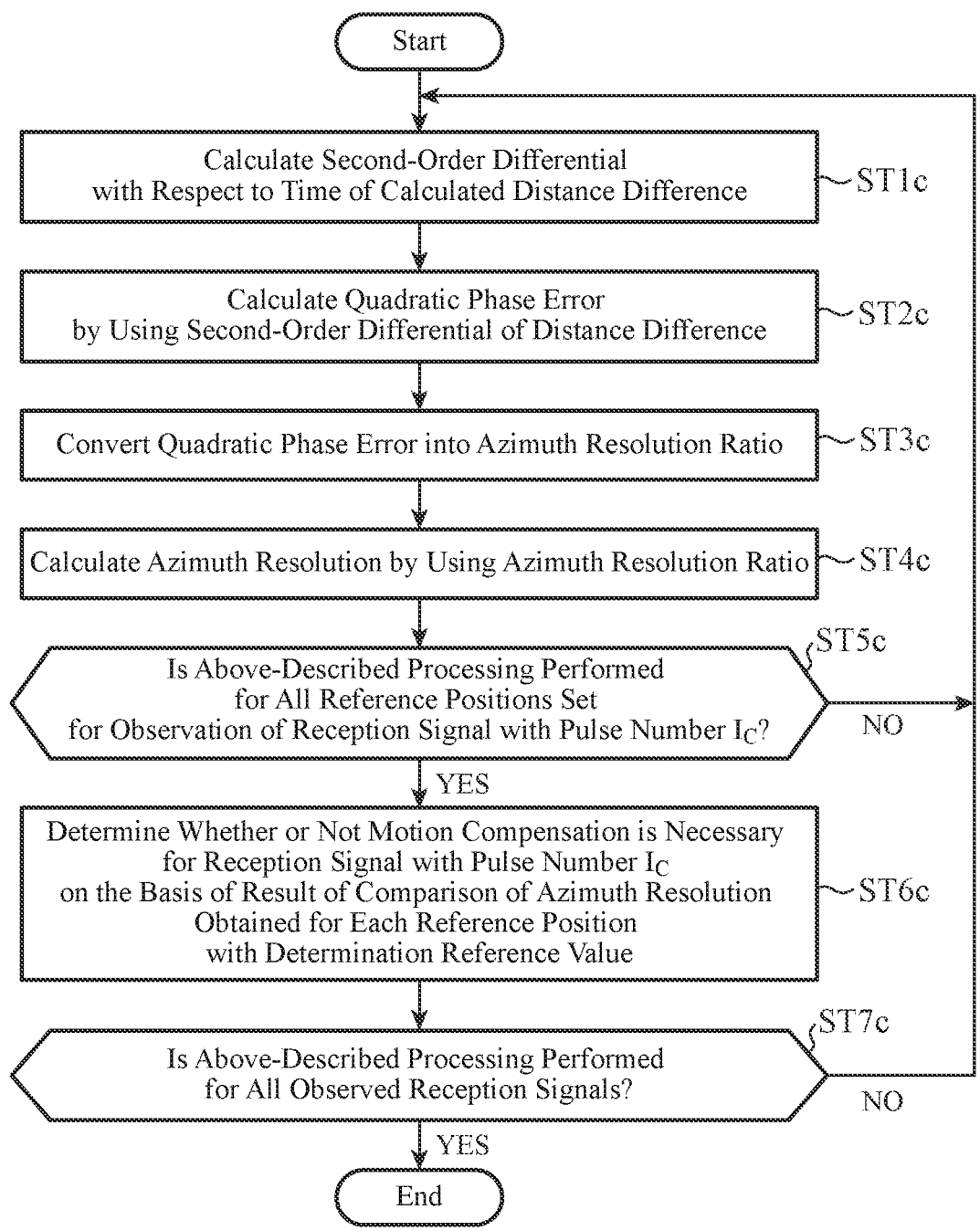
FIG. 8 is a flowchart illustrating another example of concrete processing of step ST3 in FIG. 4.

FIG. 8 is a flowchart illustrating another example of concrete processing of step ST3 in FIG. 4. Since the processing from step ST3c to step ST7c in FIG. 8 is the same as that from step ST5b to step ST9b in FIG. 7, the description thereof will not be repeated.

In step ST1c, the determining unit 22 calculates a second-order differential with respect to time of the distance difference calculated by the trajectory analyzing unit 21.

For example, the second-order differential $d^2r/dt^2$ with respect to time of the distance difference associated with a received radio wave signal with the pulse number $I_C$ among the received radio wave signals with the pulse numbers I can be calculated using Expression (5) below.

$$d^2r/dt^2 = (r(I_C+2) + r(I_C) - 2r(I_C+1))/T_{PRI}^2 \quad (5)$$

Subsequently, the determining unit 22 calculates a quadratic phase error $E_\varphi$ in accordance with Expression (6) below using the second-order differential of the distance difference (step ST2c). Processing subsequent to the calculation of the quadratic phase error $E_\varphi$ is the same as that from step ST5b to step ST9b in FIG. 7. In this manner, the processing from step ST1b to step ST3b in FIG. 7 can be omitted.

$$E_\varphi = (\pi/2\lambda)(d^2r/dt^2)T_{SA}^2 \quad (6)$$

In addition, whether or not motion compensation of a received radio wave signal is necessary is determined on the basis of the result of comparison of the azimuth resolution of the SAR image that is blurred obtained in step ST4c with the determination reference value in FIG. 8 as well, but this is a non-limiting embodiment.

For example, when any one of the second-order differential in step ST1c, the quadratic phase error in step ST2c, the azimuth resolution ratio in step ST3c, and the azimuth resolution of the SAR image that is blurred in step ST4c is determined, the other of these values can be calculated from the determined value. Thus, any of the second-order differential, the quadratic phase error, and the azimuth resolution ratio may be compared with the determination reference value.

In a case where a second-order differential is compared with a determination reference value, the determination reference value in step ST6c is a value relating to the second-order differential, and the processing from step ST2c to step ST4c can be omitted.

In a case where a quadratic phase error is compared with a determination reference value, the determination reference value in step ST6c is a value relating to the quadratic phase error, and the processing from step ST3c to step ST4c can be omitted.

Similarly, in a case where an azimuth resolution ratio is compared with a determination reference value, the determination reference value in step ST6c is a value relating to the azimuth resolution ratio, and the processing in step ST4c can be omitted.

After determining whether or not motion compensation is necessary for each of the received radio wave signals as described above, the determining unit 22 outputs a determination result of a received radio wave signal for each transmission/reception time of a radio wave or each pulse number associated with the transmission/reception time.

The motion compensating unit 23 performs the motion compensation process on the received radio wave signals with the pulse numbers for which motion compensation is determined to be necessary by the determining unit 22, and does not perform the motion compensation process on the received radio wave signals with the pulse numbers for which motion compensation is determined to be unnecessary.

Motion compensation is performed by the method described in the aforementioned reference, for example.

In the method of motion compensation described in the aforementioned reference, first-order motion compensation is first performed, and second-order motion compensation is subsequently performed, so that the influence of motion at each position in the observation range R including the reference position F is compensated.

Here, the first-order motion compensation is a process for compensating the phases and transmission/reception times of received radio wave signals by applying compensation amounts of the phase and range for the reception signal that is obtained from the positional relation among the planned trajectory M1, the trajectory M2, and the reference position F, also to the received radio wave signals that are reflected at positions other than the reference position F.

Note that since the number of reference position F is assumed to be one in the first-order motion compensation, when there are a plurality of reference positions F an average position of these reference positions F may be used as a single reference position F in the first-order motion compensation. Alternatively, a position closest to the center of the observation range R may be set as the reference position F.

After completion of the first-order motion compensation, a process called a range compression process for increasing the resolution in the range direction of the SAR sensor 3 is performed. Subsequently, the second-order motion compensation is performed.

The second-order motion compensation is a process of compensating differences between the compensation amounts of the phase and transmission/reception time for the received radio wave signal associated with the reference position F and the compensation amounts of the phases and transmission/reception times for each received radio wave signal associated with the other positions in the observation range R. In this manner, the result of the first-order motion compensation is further compensated by the second-order motion compensation.

While the motion compensation process described in the aforementioned reference is performed on all the observed received radio wave signals in the related art, operation of the motion compensation process can be performed for each of the received radio wave signals.

Thus, the motion compensating unit 23 can perform the motion compensation process on each of the received radio wave signals by using the same operation as that in the motion compensation process described in the aforementioned reference.

The image generating unit 24 performs the image generation process on the received radio wave signals on which the motion compensation process has been performed or has not been performed depending on the results of determination of the determining unit 22, to generate a SAR image of the observation objects. Examples of the method for image generation include a chirp scaling method, an ω-k method, a polar format method, and a range-Doppler method, any of which may be used.

The image generating unit 24 also outputs the generated SAR image to the display controlling unit 6a, and further stores the generated SAR image into the image storing unit 5b. The display controlling unit 6a displays the SAR image input from the image generating unit 24 on the displaying unit 6b.

As described above, in the SAR 2 according to First Embodiment, the determining unit 22 determines whether or not motion compensation is necessary for each of received radio wave signals acquired through observation on the basis of the information on differences between the planned trajectory M1 and the actual trajectory M2 of the platform 103. The motion compensating unit 23 performs the motion compensation process on the received radio wave signals for which motion compensation is determined to be necessary by the determining unit 22. The image generating unit 24 performs the image generation process on the received radio wave signals on which the motion compensation process has been performed or has not been performed depending on the results of determination of the determining unit 22, to generate a SAR image of the observation object.

In the related art, whether or not motion compensation is necessary is not determined for each of the received radio wave signals acquired through observation, and either of performing the motion compensation process on all or never performing the motion compensation process on any is selected. In contrast, the SAR 2 according to the present disclosure performs the motion compensation process on the received radio wave signals for which motion compensation is determined to be necessary, and does not perform the motion compensation process on the received radio wave signals for which motion compensation is determined to be unnecessary. This shortens the time required for motion compensation, and thus can shorten the time required until generation of a SAR image with blurring reduced by motion compensation.

In addition, in the SAR 2 according to First Embodiment, the trajectory analyzing unit 21 defines the planned trajectory M1 in a three-dimensional space on the basis of the observation data acquired by the data acquiring unit 20.

The trajectory analyzing unit 21 then calculates a distance difference between the distance from the reference position F set in the three-dimensional space to the actual trajectory M2 and the distance from the reference position F to the planned trajectory M1 for each transmission/reception time of the radio waves. The determining unit 22 determines whether or not motion compensation is necessary for each of the received radio wave signals on the basis of the distance difference. This allows accurate determination on whether or not motion compensation is necessary for each of the received radio wave signals.

Furthermore, in the SAR 2 according to First Embodiment, the determining unit 22 determines whether or not motion compensation is necessary for each of the received radio wave signals on the basis of a phase difference obtained by conversion of the distance difference.

This allows accurate determination on whether or not motion compensation is necessary for each of the received radio wave signals.

Furthermore, in the SAR 2 according to First Embodiment, the determining unit 22 determines whether or not motion compensation is necessary for each of received radio wave signals on the basis of a coefficient of a polynomial function obtained by fitting a polynomial function to the phase difference. This also allows accurate determination on whether or not motion compensation is necessary for each of the received radio wave signals.

Furthermore, in the SAR 2 according to First Embodiment, the determining unit 22 determines whether or not motion compensation is necessary for each of the received radio wave signals on the basis of the time differential value of the distance difference.

This allows accurate determination on whether or not motion compensation is necessary for each of the received radio wave signals.

Furthermore, in the SAR 2 according to First Embodiment, the determining unit 22 determines whether or not motion compensation is necessary for each of the received radio wave signals on the basis of the quadratic phase error calculated by using the distance difference.

This allows accurate determination on whether or not motion compensation is necessary for each of the received radio wave signals.

Furthermore, in the SAR 2 according to First Embodiment, the determining unit 22 determines whether or not motion compensation is necessary for each of the received radio wave signals on the basis of the azimuth resolution at each reference position F calculated by using the distance difference. This allows accurate determination on whether or not motion compensation is necessary for each of the received radio wave signals.

In addition, the reference position F to be used for calculation of the azimuth resolution of a SAR image that is blurred is set to an important position in the observation range R, so that the focus at the important position of the SAR image can be maximized.

Furthermore, the reference positions F are set to the center position and respective end positions of the observation range R, so that the azimuth resolution within tolerance can be ensured in the entire SAR image.

Second Embodiment

While the configuration for determining whether or not motion compensation is necessary for each of the received radio wave signals transmitted and received during observation has been presented in First Embodiment, a configuration for not only determining whether or not motion compensation is necessary but also selecting a content of the motion compensation process for each of received radio wave signals will be presented in Second Embodiment.

A SAR according to Second Embodiment will now be described with reference to the observation geometry in FIG. 6.

Figure 9:
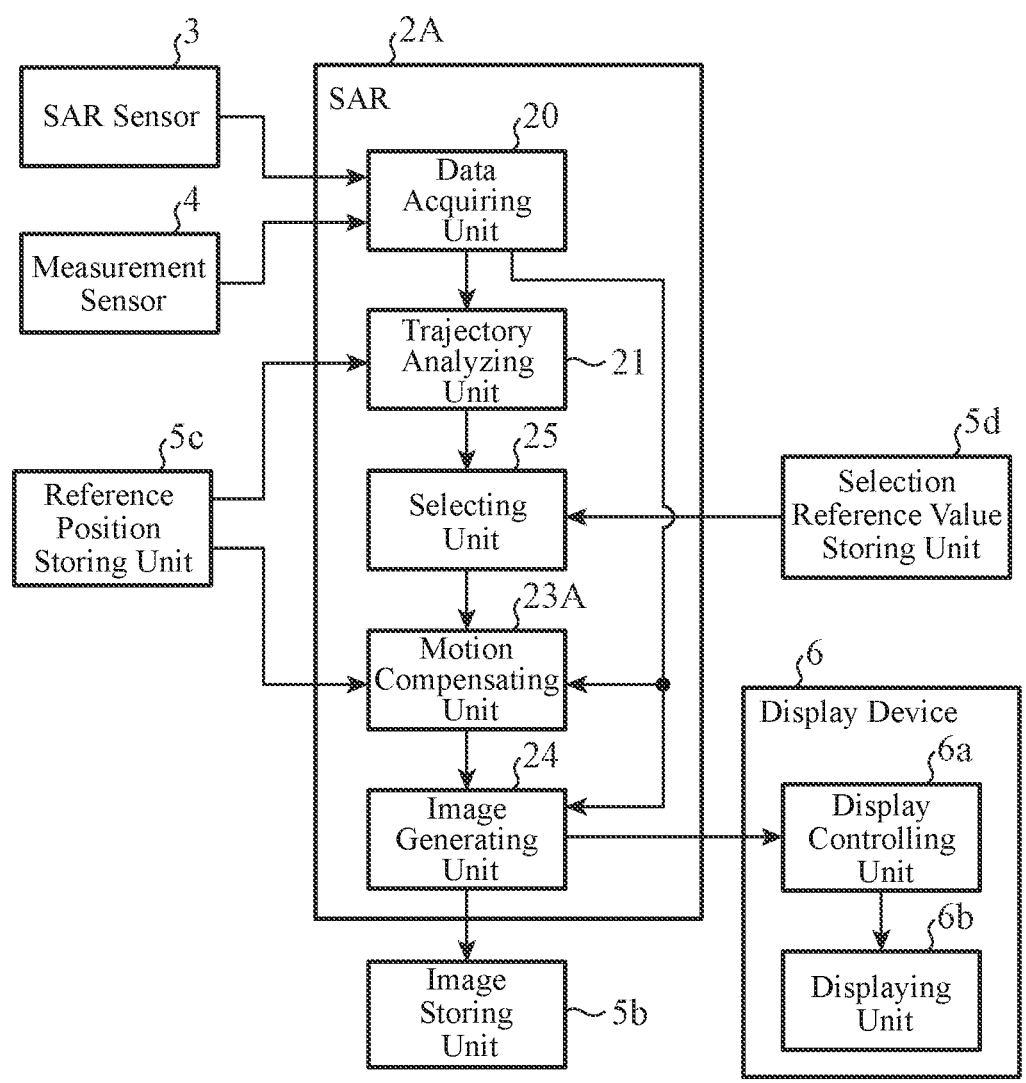
FIG. 9 is a block diagram illustrating a configuration of a SAR according to Second Embodiment of the present disclosure.

FIG. 9 is a block diagram illustrating a configuration of a SAR 2A according to Second Embodiment of the present disclosure. In FIG. 9, components that are the same as those illustrated in FIG. 2 are designated by the same reference numerals.

The SAR 2A includes a data acquiring unit 20, a trajectory analyzing unit 21, a motion compensating unit 23A, an image generating unit 24, and a selecting unit 25. In addition, a selection reference value storing unit 5d is a storage unit in which a selection reference value to be used in a selecting process of the selecting unit 25 is stored. The selection reference value storing unit 5d, the image storing unit 5b, and the reference position storing unit 5c are built in storage areas in the storage device 5, for example.

The selecting unit 25 selects a content of the motion compensation process for each of received radio wave signals obtained through observation on the basis of the information on the difference between the planned trajectory M1 and the actual trajectory M2 calculated by the trajectory analyzing unit 21. For example, a content of the motion compensation process is selected for each of the received radio wave signals on the basis of a distance difference between a distance from the planned trajectory M1 to the reference position F and a distance from the actual trajectory M2 to the reference position F, and of a selection reference value stored in the selection reference value storing unit 5d.

The motion compensating unit 23A performs the motion compensation process entailing the content selected by the selecting unit 25 on the received radio wave signal obtained through observation.

The functions of the data acquiring unit 20, the trajectory analyzing unit 21, the motion compensating unit 23A, the image generating unit 24, and the selecting unit 25 in the SAR 2A are implemented by processing circuitry.

Figure 10:
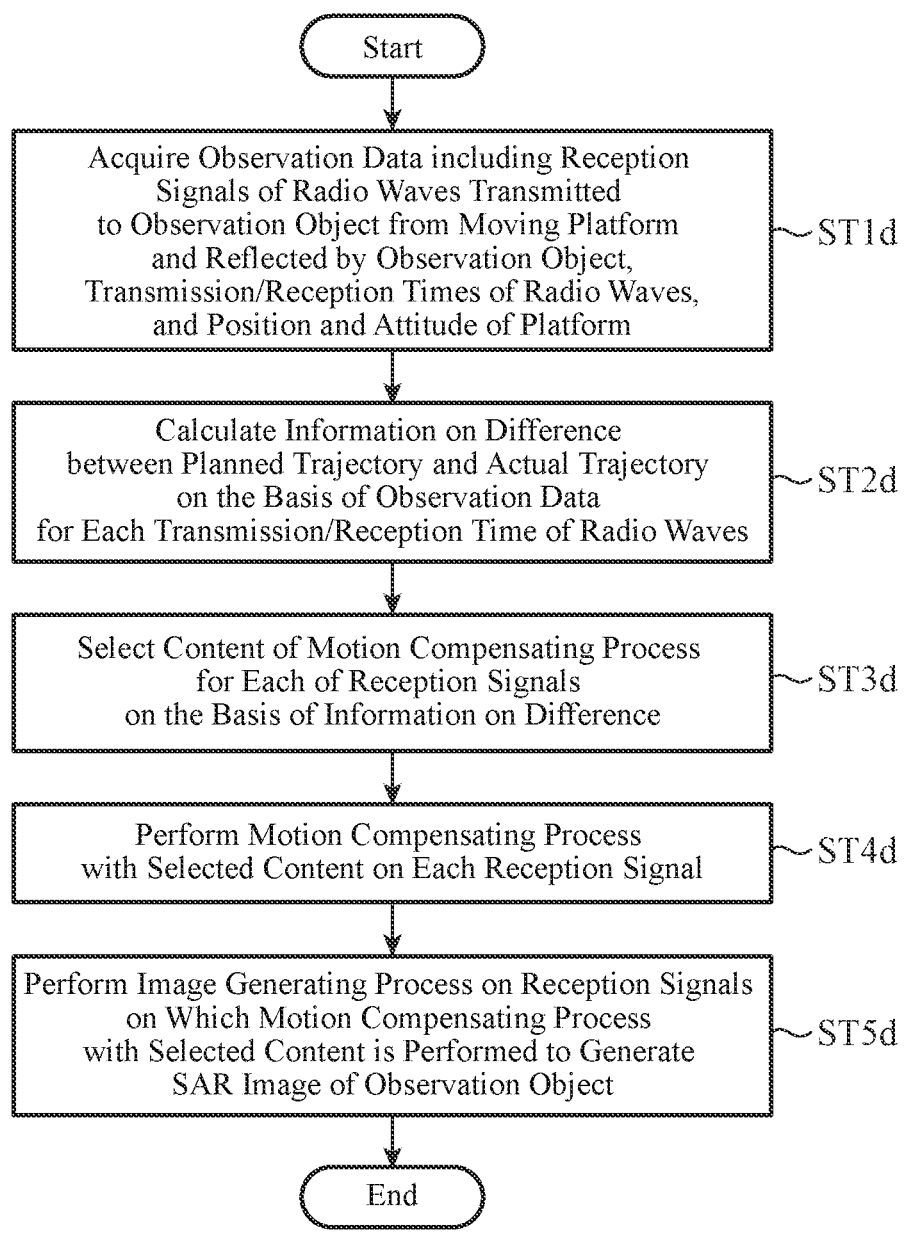
FIG. 10 is a flowchart illustrating operation of the SAR according to Second Embodiment.

Specifically, the SAR 2A includes the processing circuitry for sequentially performing step ST1d of acquiring the observation data, step ST2d of calculating information on the difference between the planned trajectory and the actual trajectory for each of transmission/reception times of radio waves on the basis of the observation data, step ST3d of selecting the content of the motion compensation process for each of the received radio wave signals on the basis of the information on the difference, step ST4d of performing the motion compensation process entailing the selected content on the respective received radio wave signals, and step ST5d of performing the image generation process on the received radio wave signals on which the motion compensation process entailing the selected content has been performed to generate a SAR image of the observation object, as illustrated in FIG. 10.

The processing circuitry may be dedicated hardware, or a CPU for reading and executing programs stored in a memory.

In a case where the processing circuitry is the processing circuitry 100 that is dedicated hardware as illustrated in FIG. 3A, the processing circuitry 100 may be a single circuit, a composite circuit, a programmed processor, a parallel-programmed processor, an ASIC, an FPGA, or a combination thereof, for example. Further, the functions of the data acquiring unit 20, the trajectory analyzing unit 21, the motion compensating unit 23A, the image generating unit 24, and the selecting unit 25 may be implemented by respective processing circuits, or the functions of the respective units may be collectively implemented by one processing circuit.

In a case where the processing circuitry is the CPU 101 as illustrated in FIG. 3B, the functions of the data acquiring unit 20, the trajectory analyzing unit 21, the motion compensating unit 23A, the image generating unit 24, and the selecting unit 25 are implemented by software, firmware, or combination of software and firmware.

The software and firmware are described in the form of programs and stored in a memory 102. The CPU 101 implements the functions of the respective units by reading and executing the programs stored in the memory 102. Thus, the SAR 2A includes the memory 102 for storing programs, which, when executed by the CPU 101, results in execution of the processes in steps ST1d to ST5d described above.

These programs cause a computer to execute the procedures or the methods of the data acquiring unit 20, the trajectory analyzing unit 21, the motion compensating unit 23A, the image generating unit 24, and the selecting unit 25.

Alternatively, some of the functions of the data acquiring unit 20, the trajectory analyzing unit 21, the motion compensating unit 23A, the image generating unit 24, and the selecting unit 25 may be implemented by dedicated hardware, and others may be implemented by software or firmware.

For example, the function of the data acquiring unit 20 is implemented by the processing circuitry 100 that is dedicated hardware, and the functions of the trajectory analyzing unit 21, the motion compensating unit 23A, the image generating unit 24, and the selecting unit 25 are implemented by the CPU 101 executing the programs stored in the memory 102.

As described above, the processing circuitry is capable of implementing the above-described functions by hardware, software, firmware, or combination thereof.

Next, operation will be explained.

Figure 11:
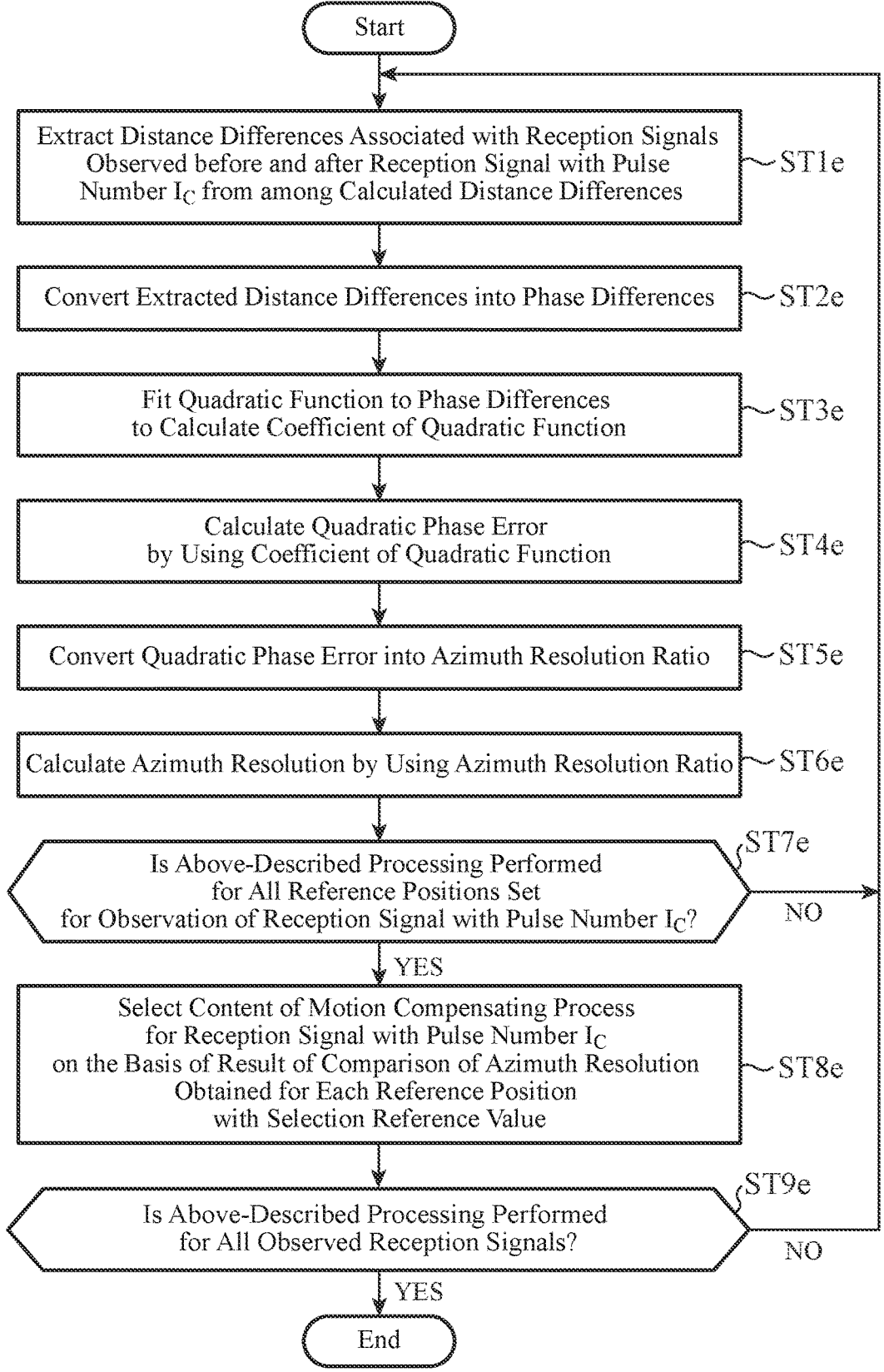
FIG. 11 is a flowchart illustrating concrete processing of step ST3$d$ in FIG. 10.

FIG. 11 is a flowchart illustrating concrete processing of step ST3d in FIG. 10. The processing from step ST1e to step ST7e in FIG. 11 is the same as that from step ST1b to step ST7b in FIG. 7 in a case where the selecting unit 25 performs the processing in these steps. In addition, since the processing in step ST9e is the same as that in step ST9b in FIG. 7 in a case where the selecting unit 25 performs the processing in step ST9b, the description thereof will not be repeated.

In step ST8e, the selecting unit 25 selects a content of the motion compensation process for the received radio wave signal with the pulse number $I_C$ on the basis of a result of comparison of the azimuth resolution of a SAR image that is blurred calculated for each reference position F with the selection reference value. For example, in a case where reference positions F are set to the center position and respective end positions of the observation range R, when the differences in the azimuth resolutions calculated for the respective reference positions F are smaller than a difference set as the selection reference value, only the first-order motion compensation is selected as the content of the motion compensation process.

When the differences are not smaller than the difference set as the selection reference value, both of the first-order motion compensation and the second-order motion compensation are selected as the content of the motion compensation process.

Furthermore, when an azimuth resolution of a SAR image that is blurred calculated for the respective reference positions F is larger than a threshold set as the selection reference value, both of the first-order motion compensation and the second-order motion compensation are selected as the content of the motion compensation process. When the azimuth resolution is not larger than the threshold, only the first-order motion compensation may be selected as the content of the motion compensation process.

For example, in a case where an upper limit of the azimuth resolution of a SAR image that is blurred is set as the selection reference value, the selecting unit 25 compares the maximum value of the azimuth resolutions associated with all the reference positions F described above with the selection reference value (the upper limit of the azimuth resolution).

When the maximum value of the azimuth resolutions is not larger than the selection reference value, the selecting unit 25 determines that the azimuth resolution is not degraded by the motion of the platform 103 and may select not performing the motion compensation process as the content of the motion compensation process for the received radio wave signals with the pulse numbers $I_C$.

In contrast, when the maximum value of the azimuth resolutions is larger than the selection reference value, the selecting unit 25 selects the motion compensation process with the content associated with the received radio wave signal with the pulse number $I_C$.

In this manner, the motion compensation process is not performed on the received radio wave signals for which motion compensation is unnecessary, and the motion compensation process with a necessary content is performed for the received radio wave signals for which motion compensation is necessary, which shortens the time required for motion compensation. This can further shorten the time required until generation of a SAR image with blurring reduced by motion compensation than the configuration presented in First Embodiment does.

The content of the motion compensation process for a received radio wave signal is selected on the basis of the result of comparison of the azimuth resolution of the SAR image that is blurred obtained in step ST6e with the selection reference value in FIG. 11, but this is a non-limiting embodiment.

For example, when any one of the coefficient of the quadratic function in step ST3e, the quadratic phase error in step ST4e, the azimuth resolution ratio in step ST5e, and the azimuth resolution of the SAR image that is blurred in step ST6e is determined, the other of these values can be calculated from the determined value. Thus, any of the coefficient of the quadratic function, the quadratic phase error, and the azimuth resolution ratio may be compared with the determination reference value.

In a case where the coefficient of the quadratic function is compared with the selection reference value, the selection reference value in step ST8e is a value relating to the coefficient of the quadratic function, and the processing from step ST4e to step ST6e can be omitted.

In a case where the quadratic phase error is compared with the selection reference value, the selection reference value in step ST8e is a value relating to the quadratic phase error, and the processing from step ST5e to step ST6e can be omitted.

Similarly, in a case where the azimuth resolution ratio is compared with the selection reference value, the selection reference value in step ST8e is a value relating to the azimuth resolution ratio, and the processing in step ST6e can be omitted.

Figure 12:
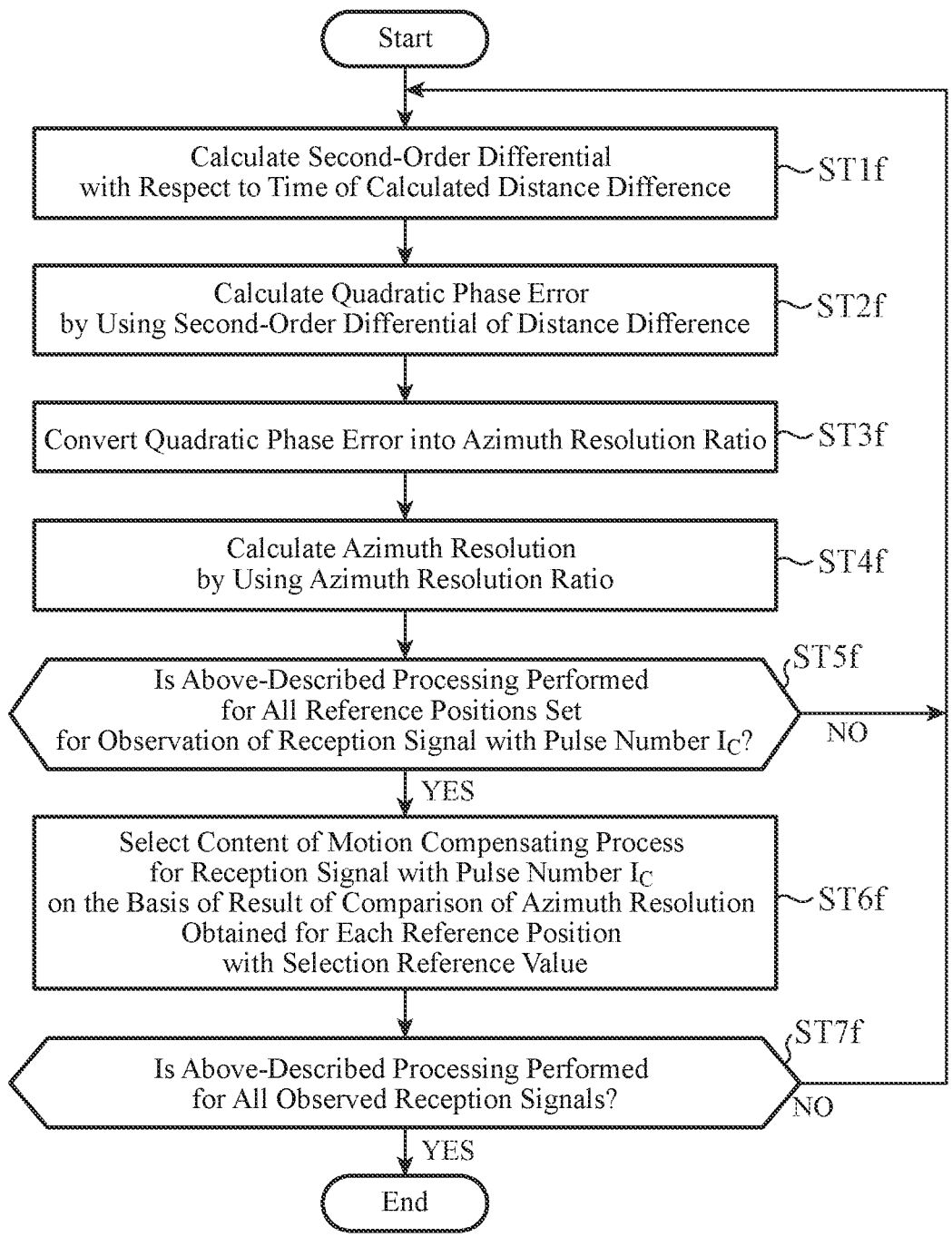
FIG. 12 is a flowchart illustrating another example of concrete processing of step ST3$d$ in FIG. 10.

FIG. 12 is a flowchart illustrating another example of concrete processing of step ST3d in FIG. 10. Since the processing from step ST3f to step ST7f in FIG. 12 is the same as that from step ST5e to step ST9e in FIG. 11, the description thereof will not be repeated.

In step ST1f, the selecting unit 25 calculates a second-order differential with respect to time of the distance difference calculated by the trajectory analyzing unit 21.

Similarly to First Embodiment, the second-order differential $d^2r/dt^2$ with respect to time of the distance difference associated with a received radio wave signal with the pulse number $I_C$ among the received radio wave signals with the pulse number I can be calculated using Expression (5) above.

Subsequently, the selecting unit 25 calculates the quadratic phase error $E_\varphi$ in accordance with Expression (6) above using the second-order differential of the distance difference (step ST2f).

Processing subsequent to the calculation of the quadratic phase error $E_\varphi$ is the same as that from step ST5e to step ST9e in FIG. 11. In this manner, the processing from step ST1e to step ST3e in FIG. 11 can be omitted.

In addition, whether or not motion compensation process of a received radio wave signal is necessary is determined on the basis of the result of comparison of the azimuth resolution of the SAR image that is blurred obtained in step ST4f with the selection reference value in FIG. 12 as well, but this is an non-limiting embodiment.

For example, when any one of the second-order differential in step ST1f, the quadratic phase error in step ST2f, the azimuth resolution ratio in step ST3f, and the azimuth resolution of the SAR image that is blurred in step ST4f is determined, the other of these values can be calculated from the determined value. Thus, any of the second-order differential, the quadratic phase error, and the azimuth resolution ratio may be compared with the selection reference value.

In a case where the second-order differential is compared with the selection reference value, the selection reference value in step ST6f is a value relating to the second-order differential, and the processing from step ST2f to step ST4f can be omitted.

In a case where the quadratic phase error is compared with the selection reference value, the selection reference value in step ST6f is a value relating to the quadratic phase error, and the processing from step ST3f to step ST4f can be omitted.

Similarly, in a case where the azimuth resolution ratio is compared with the selection reference value, the selection reference value in step ST6f is a value relating to the azimuth resolution ratio, and the processing in step ST4f can be omitted.

As described above, the SAR 2A according to Second Embodiment selects a content of the motion compensation process for each of received radio wave signals on the basis of the information on differences between the planned trajectory M1 and the actual trajectory M2 of the platform 103, and performs the motion compensation process entailing the selected content on the received radio wave signals. The SAR 2A then performs the image generation process on the received radio wave signals on which the motion compensation process entailing the selected content has been performed, to generate a SAR image of the observation object.

The configuration as described above allows the motion compensation process with a content necessary for each of the received radio wave signals obtained through observation to be performed, which can reduce blurring of a SAR image.

Further, since the motion compensation process only with a content necessary for each of the received radio wave signals is performed, the time required for motion compensation is shortened. This can shorten the time required until generation of a SAR image with blurring reduced by motion compensation.

In addition, in the SAR 2A according to Second Embodiment, the trajectory analyzing unit 21 defines the planned trajectory M1 in a three-dimensional space on the basis of the observation data acquired by the data acquiring unit 20.

The trajectory analyzing unit 21 then calculates a difference in distance between the distance from the reference position F set in the three-dimensional space to the actual trajectory M2 and the distance from the reference position F to the planned trajectory M1 for each transmission/reception time of the radio waves. The selecting unit 25 selects a content of the motion compensation process for each of the received radio wave signals on the basis of the distance difference. This also allows accurate selection of the content of the motion compensation process for each of the received radio wave signals.

Furthermore, in the SAR 2A according to Second Embodiment, the selecting unit 25 selects the content of the motion compensation process for each of the received radio wave signals on the basis of the azimuth resolution at each reference position F, which is calculated by using the distance difference, and the selection reference value. This allows accurate selection of the content of the motion compensation process for each of the received radio wave signals.

Furthermore, in the SAR 2A according to Second Embodiment, the content of the motion compensation process selected by the selecting unit 25 may include not performing the motion compensation process.

As a result, since the compensating process is not performed on reception signals for which motion compensation is unnecessary, the time required for motion compensation can be further shortened. This can further shorten the time required until generation of a SAR image with blurring reduced by motion compensation than the configuration presented in First Embodiment does.

Third Embodiment

While First and Second Embodiments are based on the assumption that no measurement error is present in the position and the attitude of the platform 103, a configuration for reducing blurring of a SAR image caused by a measurement error will be described in Third Embodiment.

Figure 13:
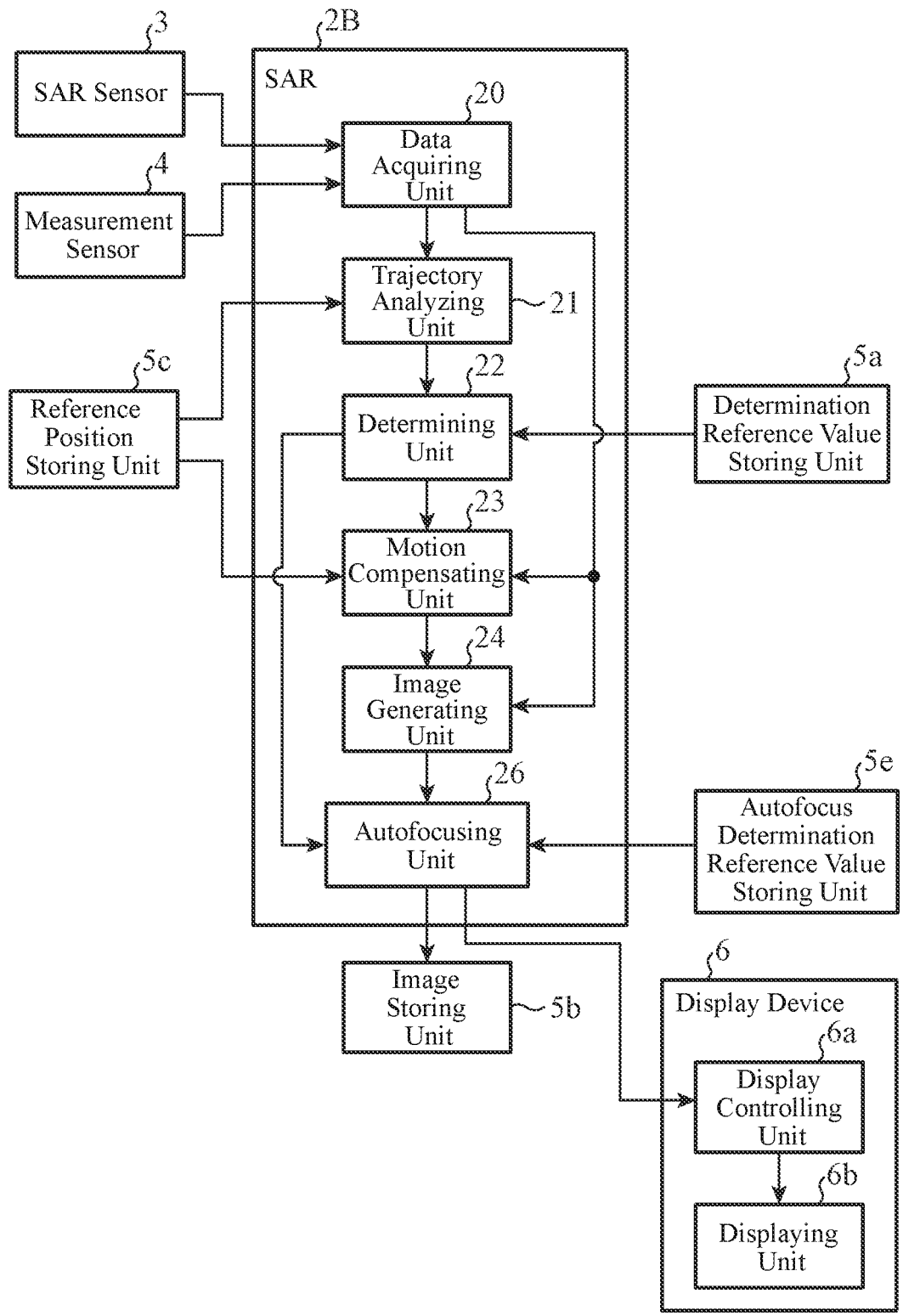
FIG. 13 is a block diagram illustrating a configuration of a SAR according to Third Embodiment of the present disclosure.

FIG. 13 is a block diagram illustrating a configuration of a SAR 2B according to Third Embodiment of the present disclosure. In FIG. 13, components that are the same as those illustrated in FIG. 2 are designated by the same reference numerals. The SAR 2B includes a data acquiring unit 20, a trajectory analyzing unit 21, a determining unit 22, a motion compensating unit 23, an image generating unit 24, and an autofocusing unit 26.

An autofocus determination reference value storing unit 5e is a storage unit in which an autofocus determination reference value to be used in a process for determining whether or not an autofocusing process is necessary is stored.

Further, the determination reference value storing unit 5a, the image storing unit 5b, the reference position storing unit 5c, and the autofocus determination reference value storing unit 5e are built in storage areas in the storage device 5, for example.

The autofocusing unit 26 compares a difference between a resolution obtained by measurement of a region of a SAR image generated from a reception signal on which the motion compensation process has not been performed and a resolution calculated by using a distance difference for this region with an autofocus determination reference value. When this difference is larger than the autofocus determination reference value, the autofocusing unit 26 performs an autofocusing process on this region.

Next, operation will be explained.

Figure 14:
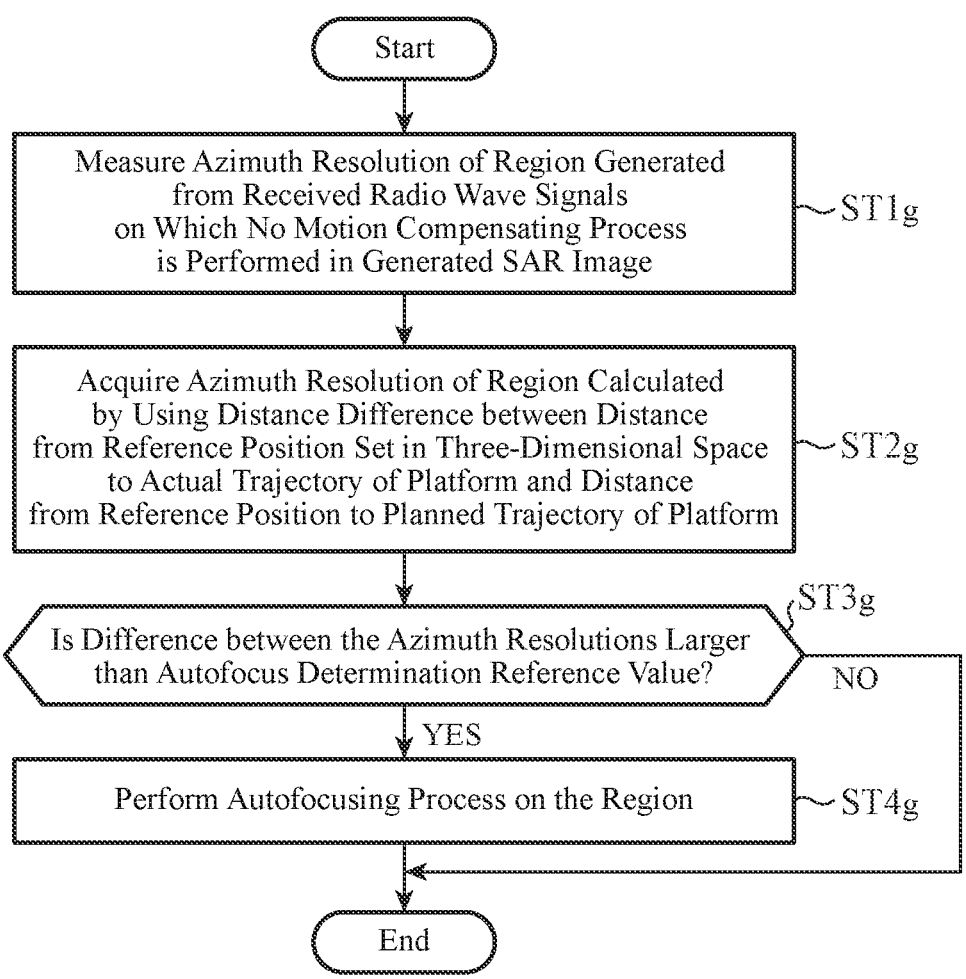
FIG. 14 is a flowchart illustrating operation of an autofocusing unit.

FIG. 14 is a flowchart illustrating operation of the autofocusing unit 26.

First, the autofocusing unit 26 identifies the region generated from a received radio wave signal on which the motion compensation process has not been performed in the SAR image generated by the image generating unit 24 on the basis of the result of determination on whether or not motion compensation is necessary for each of received radio wave signals transmitted and received during observation.

The autofocusing unit 26 then measures the azimuth resolution of the region generated from the received radio wave signal on which the motion compensation process has not been performed (step ST1g).

An example of the method for measuring the azimuth resolution can be extracting bright spots with high reflection intensities from the SAR image, performing upsampling on the extracted bright spots, and measuring the azimuth resolution from the widths of the upsampled bright spots. In this measuring method, the widths of the bright spots extracted from the SAR image are measured as beam widths since the resolution in the azimuth direction is determined by the beam width of an observing antenna beam B of the SAR sensor 3.

Subsequently, the autofocusing unit 26 acquires, from the determining unit 22, the azimuth resolution calculated by using the distance difference between the trajectories associated with the received radio wave signal on which the motion compensation process has not been performed as identified in step ST1g (step ST2g).

Note that the distance difference between the trajectories is a distance difference between the distance between the SAR sensor 3 of the platform 103 following the planned trajectory M1 and the reference position F and the distance between the SAR sensor 3 of the platform 103 following the actual trajectory M2 and the reference position F.

In addition, the azimuth resolution is the resolution obtained in the processing from step ST1b to step ST6b in FIG. 7 or the processing from step ST1c to step ST4c in FIG. 8, for example.

Subsequently, the autofocusing unit 26 determines whether or not the difference between the azimuth resolution measured in step ST1g and the azimuth resolution acquired in step ST2g is larger than the autofocus determination reference value (step ST3g).

When the difference is larger than the autofocus determination reference value (step ST3g; YES), the autofocusing unit 26 performs the autofocusing process on the region in the SAR image (step ST4g).

When the difference is large, the motion compensation may have been determined to be unnecessary for the received radio wave signal used for generation of the region owing to a measurement error in the information indicating the position and the attitude of the platform 103 although the motion compensation should have been necessary.

Thus, when the difference is larger than the preset autofocus determination reference value, the information indicating the position and the attitude of the platform 103 is determined to have a measurement error, and the autofocusing process is performed.

In contrast, when the difference is not larger than the autofocus determination reference value (step ST3g; NO), the autofocusing unit 26 determines that the information indicating the position and the attitude of the platform 103 has no measurement error, and terminates the process.

As described above, the SAR 2B according to Third Embodiment includes the autofocusing unit 26. The autofocusing unit 26 compares the difference between the resolution obtained by measurement of the region generated from the received radio wave signal on which the motion compensation process has not been performed in the SAR image and the resolution calculated by using the distance difference for this region with the autofocus determination reference value. When the difference is larger than the autofocus determination reference value, the autofocusing unit 26 performs the autofocusing process on this region.

As a result, even when a measurement error occurs in the information indicating the position and the attitude of the platform 103, a SAR image with reduced blurring can be obtained using the autofocusing process.

While the case where the autofocusing unit 26 is added to the configuration of First Embodiment has been presented in Third Embodiment, the autofocusing unit 26 may also be added to the configuration of Second Embodiment. This configuration also produces the same advantageous effects as above.

Fourth Embodiment

While the total time to be taken for motion compensation cannot be adjusted by the configurations presented in First to Third Embodiments, a configuration capable of adjusting the total time to be taken for the motion compensation so that the total time will be within preset allowed time will be described in Fourth Embodiment.

Figure 15:
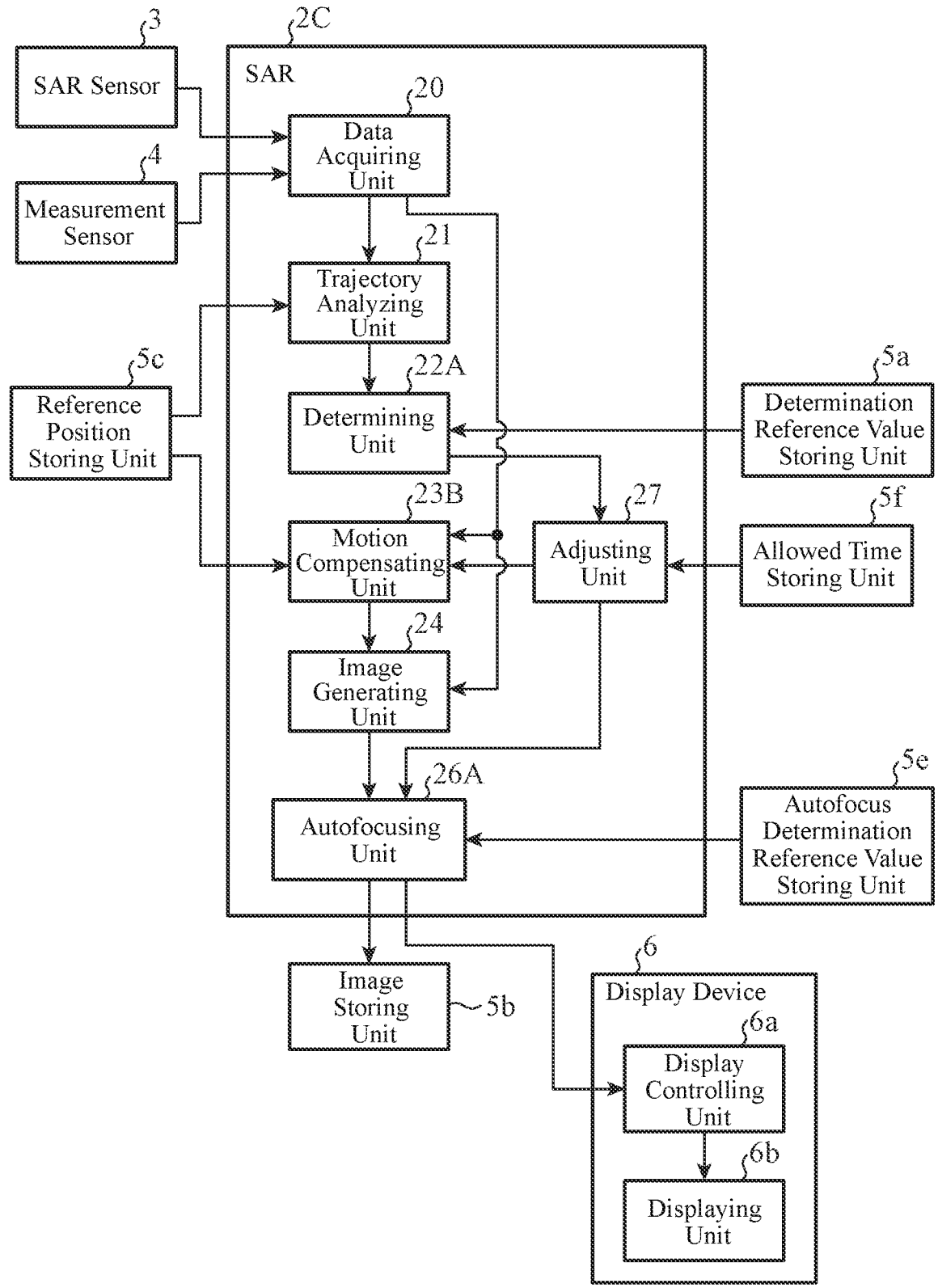
FIG. 15 is a block diagram illustrating a configuration of a SAR according to Fourth Embodiment of the present disclosure.

FIG. 15 is a block diagram illustrating a configuration of a SAR 2C according to Fourth Embodiment of the present disclosure. In FIG. 15, components that are the same as those illustrated in FIG. 13 are designated by the same reference numerals.

The SAR 2C includes a data acquiring unit 20, a trajectory analyzing unit 21, a determining unit 22A, a motion compensating unit 23B, an image generating unit 24, an autofocusing unit 26A, and an adjusting unit 27.

An allowed time storing unit 5f is a storage unit in which allowed time of the total time to be taken for motion compensation and time to be taken for motion compensation of each received radio wave signal are stored.

In addition, the determination reference value storing unit 5a, the image storing unit 5b, the reference position storing unit 5c, the autofocus determination reference value storing unit 5e, and the allowed time storing unit 5f are built in storage areas in the storage device 5, for example.

The determining unit 22A determines whether or not motion compensation is necessary for each of the received radio wave signals on the basis of the information on the difference between the planned trajectory M1 and the actual trajectory M2 calculated by the trajectory analyzing unit 21, and outputs a result of the determination to the adjusting unit 27.

The motion compensating unit 23B performs the motion compensation process on the received radio wave signals for which motion compensation is determined to be necessary and does not perform motion compensation process on the received radio wave signals for which motion compensation is determined to be unnecessary on the basis of necessity/unnecessity of motion compensation of each of received radio wave signals set by the adjusting unit 27.

The autofocusing unit 26A identifies a region generated from a received radio wave signal on which the motion compensation process has not been performed in a SAR image on the basis of the necessity/unnecessity of motion compensation of each of the received radio wave signals set by the adjusting unit 27. When the difference between the resolution obtained by measurement of the identified region and the resolution calculated by using the distance difference between the planned trajectory M1 and the actual trajectory M2 for the region is larger than the determination reference value, the autofocusing unit 26A then performs the autofocusing process on the region.

The adjusting unit 27 adjusts the time to be taken for motion compensation by changing the number of received radio wave signals on which the motion compensation process is to be performed among the received radio wave signals for which motion compensation is determined to be necessary by the determining unit 22A, so that the total time to be taken for motion compensation will be within the allowed time.

For example, the total time to be taken for motion compensation is estimated on the basis of the time to be taken for motion compensation of each of the received radio wave signals acquired through observation and the number of received radio wave signals for which motion compensation is determined to be necessary. When the total time exceeds the allowed time, the number of received radio wave signals for which motion compensation is determined to be necessary is changed.

Next, operation will be explained.

Figure 16:
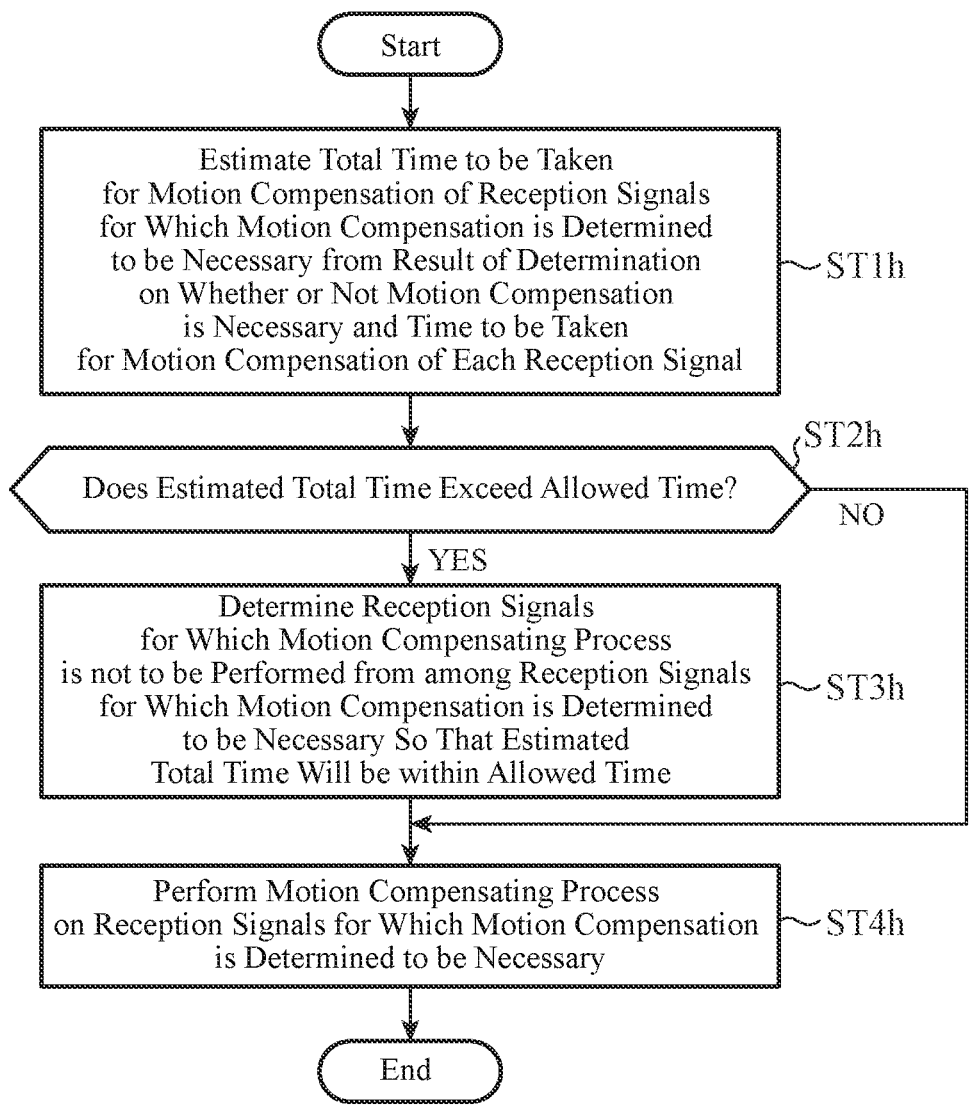
FIG. 16 is a flowchart illustrating operation of an adjusting unit in FIG. 15.

FIG. 16 is a flowchart illustrating operation of the adjusting unit 27 in FIG. 15.

First, the adjusting unit 27 estimates the total time to be taken for motion compensation from the result of determination on whether or not motion compensation is necessary for each of the received radio wave signals input from the determining unit 22A and the time to be taken for motion compensation of each reception signal read from the allowed time storing unit 5f (step ST1h).

For example, a result of multiplying the number of received radio wave signals for which motion compensation is determined to be necessary by the determining unit 22A by the time required for motion compensation of each received radio wave signal is estimated to be the total time to be taken for motion compensation.

Subsequently, the adjusting unit 27 determines whether or not the total time estimated in step ST1h exceeds the allowed time read from the allowed time storing unit 5f (step ST2h).

In this process, when the estimated total time is not longer than the allowed time (step ST2h; NO), the adjusting unit 27 sets the result of determination by the determining unit 22A in the motion compensating unit 23B without any change.

In contrast, when the estimated total time exceeds the allowed time (step ST2h; YES), the adjusting unit 27 determines received radio wave signals for which the motion compensation process is not performed from among the received radio wave signals for which motion compensation is determined to be necessary so that the total time will be within the allowed time (step ST3h).

For example, the number of received radio wave signals on which the motion compensation process is performed is changed in such a manner that received radio wave signals on which the motion compensation process is not performed is determined in descending order of the azimuth resolution of a SAR image that is blurred among the received radio wave signals for which motion compensation is determined to be necessary.

Note that the azimuth resolution of a SAR image that is blurred is calculated for each of the received radio wave signals by the determining unit 22A similarly to that in First Embodiment.

The information indicating whether or not motion compensation is necessary for each of the received radio wave signals determined by the adjusting unit 27 is set in the motion compensating unit 23B.

The motion compensating unit 23B performs the motion compensation process on the received radio wave signals for which motion compensation is determined to be necessary on the basis of the set information from the adjusting unit 27 (step ST4h). In this case, the total time taken for motion compensation is not longer than the allowed time.

As a result, even in a case where the time until generation of a SAR image is limited, a SAR image with blurring reduced using motion compensation is generated within the time limit.

While a case in which the time to be taken for the autofocusing process is not considered is illustrated in FIG. 16, time including the time to be taken for the autofocusing process may be adjusted.

For example, the adjusting unit 27 estimates the total time to be taken for both of the motion compensation and the autofocusing process, and determines received radio wave signals on which the motion compensation process is not performed from among the received radio wave signals for which motion compensation is determined to be necessary so that the total time will be within the allowed time. Information on the thus determined received radio wave signals on which the motion compensation process is not performed is set in the autofocusing unit 26A by the adjusting unit 27. The autofocusing unit 26A performs the autofocusing process on a SAR image output from the image generating unit 24 on the basis of the information set by the adjusting unit 27. As a result, even in a case where the time until generation of a SAR image is limited, a SAR image with blurring reduced by the motion compensation and the autofocusing process can be generated within the time limit.

Figure 17:
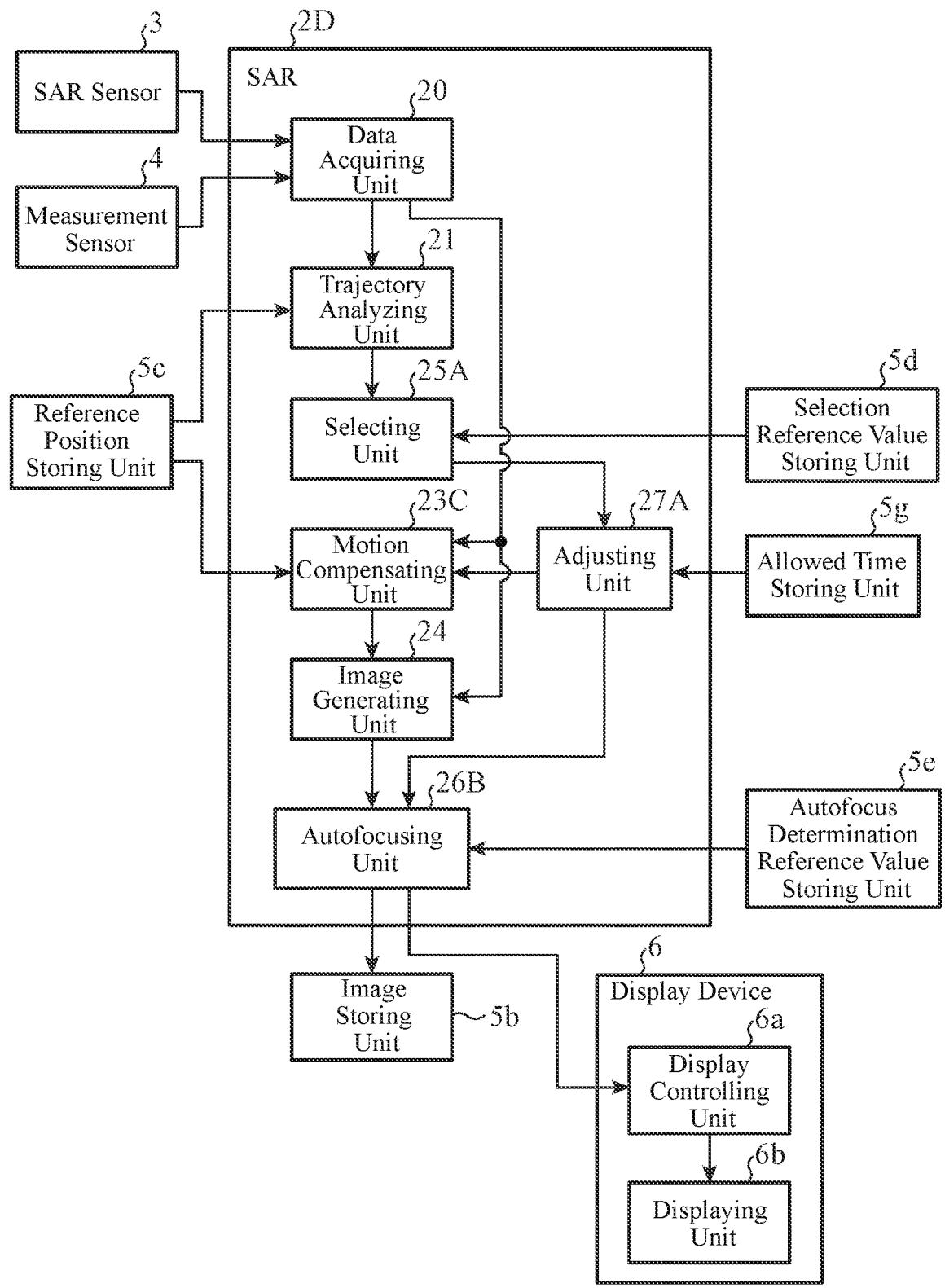
FIG. 17 is a block diagram illustrating another configuration of a SAR according to Fourth Embodiment.

FIG. 17 is a block diagram illustrating another configuration of a SAR 2D according to Fourth Embodiment.

In FIG. 17, components that are the same as those illustrated in FIGS. 2, 13, and 15 are designated by the same reference numerals. The SAR 2D includes a data acquiring unit 20, a trajectory analyzing unit 21, a motion compensating unit 23C, an image generating unit 24, a selecting unit 25A, an autofocusing unit 26B, and an adjusting unit 27A.

An allowed time storing unit 5g is a storage unit in which allowed time of the total time to be taken for motion compensation and time required for each content of the motion compensation process are stored.

In addition, the image storing unit 5b, the reference position storing unit 5c, the autofocus determination reference value storing unit 5e, and the allowed time storing unit 5g are built in storage areas in the storage device 5, for example.

The selecting unit 25A selects a content of the motion compensation process for each of received radio wave signals on the basis of the information on the difference between the planned trajectory M1 and the actual trajectory M2 calculated by the trajectory analyzing unit 21, and outputs a result of the selection to the adjusting unit 27A.

The motion compensating unit 23C performs the motion compensation process on the received radio wave signals, the content of the motion compensation process for each of the received radio wave signals being set by the adjusting unit 27A.

The autofocusing unit 26B identifies a region generated from a received radio wave signal on which the motion compensation process has not been performed in a SAR image on the basis of the necessity/unnecessity of motion compensation of each of the received radio wave signals set by the adjusting unit 27A. When the difference between the resolution obtained by measurement of the identified region and the resolution calculated by using the distance difference between the planned trajectory M1 and the actual trajectory M2 for the region is larger than the determination reference value, the autofocusing unit 26B then performs the autofocusing process on the region.

The adjusting unit 27A also adjusts the time to be taken for motion compensation by changing the contents of the motion compensation process selected by the selecting unit 25A, so that the total time to be taken for motion compensation will be within the allowed time.

Next, operation will be explained.

Figure 18:
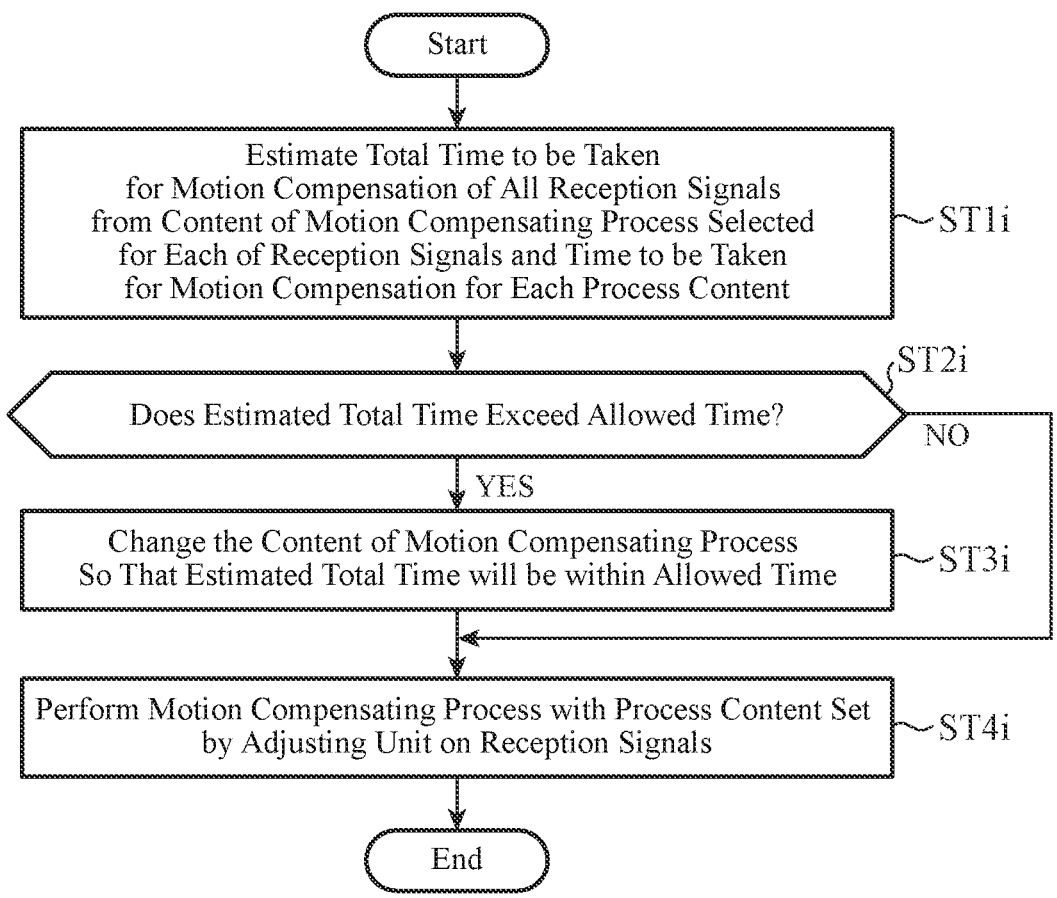
FIG. 18 is a flowchart illustrating operation of an adjusting unit in FIG. 17.

FIG. 18 is a flowchart illustrating operation of the adjusting unit 27A in FIG. 17.

First, the adjusting unit 27A estimates the total time to be taken for motion compensation from the result of selection of the content of the motion compensation process for each of the received radio wave signals input from the selecting unit 25A and the time required for each of the contents of the motion compensation process read from the allowed time storing unit 5g (step ST1i).

For example, a result of adding respective required times associated with the content of the motion compensation process selected for the respective received radio wave signals by the selecting unit 25A is estimated to be the total time to be taken for motion compensation.

Subsequently, the adjusting unit 27A determines whether or not the total time estimated in step ST1i exceeds the allowed time read from the allowed time storing unit 5g (step ST2i).

In this process, when the estimated total time is not longer than the allowed time (step ST2i; NO), the adjusting unit 27A sets the result of selection by the selecting unit 25A in the motion compensating unit 23C without any change.

In contrast, when the estimated total time exceeds the allowed time (step ST2*i*; YES), the adjusting unit 27A changes the content of the motion compensation process for each of the received radio wave signals so that the estimated total time will be within the allowed time (step ST3*i*). For example, the contents of the motion compensation process are changed to not performing the motion compensation process in descending order of the azimuth resolution of a SAR image that is blurred among the received radio wave signals for which motion compensation is determined to be necessary.

Note that the azimuth resolution of a SAR image that is blurred is calculated for each of the received radio wave signals by the selecting unit 25A similarly to that in Second Embodiment.

The information indicating the content of the motion compensation process for each of the received radio wave signals changed by the adjusting unit 27A is set in the motion compensating unit 23C.

The motion compensating unit 23C performs the motion compensation process with the content set by the adjusting unit 27A on the received radio wave signals (step ST4*i*). In this case, the total time taken for motion compensation is not longer than the allowed time. As a result, even in a case where the time until generation of a SAR image is limited, a SAR image with reduced blurring can be generated within the time limit.

While a case in which the time to be taken for the autofocusing process is not considered is illustrated in FIG. 18, time including the time to be taken for the autofocusing process may be adjusted.

For example, the adjusting unit 27A estimates the total time to be taken for both of the motion compensation and the autofocusing process, and determines received radio wave signals on which the motion compensation process is not performed from among the received radio wave signals for which motion compensation is determined to be necessary so that the total time will be within the allowed time. Information on the thus determined received radio wave signals on which the motion compensation process is not performed is set in the autofocusing unit 26B by the adjusting unit 27A. The autofocusing unit 26B performs the autofocusing process on a SAR image output from the image generating unit 24 on the basis of the information set by the adjusting unit 27A. As a result, even in a case where the time until generation of a SAR image is limited, a SAR image with blurring reduced by the motion compensation and the autofocusing process can be generated within the time limit.

As described above, the SAR 2C according to Fourth Embodiment includes the adjusting unit 27. The adjusting unit 27 adjusts the time to be taken for motion compensation by changing the number of received radio wave signals on which the motion compensation process is to be performed among the received radio wave signals for which motion compensation is determined to be necessary by the determining unit 22A, so that the time to be taken for motion compensation will be within the allowed time.

As a result, even in a case where the time until generation of a SAR image is limited, a SAR image with blurring reduced by motion compensation can be generated within the time limit.

In addition, the SAR 2D according to Fourth Embodiment includes the adjusting unit 27A. The adjusting unit 27A adjusts the time to be taken for motion compensation by changing content of the motion compensation process selected by the selecting unit 25A, so that the time to be taken for motion compensation will be within the allowed time.

As a result, even in a case where the time until formation of a SAR image is limited, a SAR image with blurring reduced by motion compensation can be generated within the time limit.

While the case where the adjusting unit 27 is added to the configuration of Third Embodiment and the case where the adjusting unit 27A is added to a configuration combining the second and Third Embodiments have been presented in Fourth Embodiment, the present disclosure is not limited thereto.

For example, an adjusting unit may be added to the configuration of First Embodiment or to the configuration of Second Embodiment. These configurations also produce the same advantageous effects as above.

Note that the embodiments of the present disclosure can be freely combined, any components in the embodiments can be modified, and any components can be omitted in the embodiments within the scope of the invention.

INDUSTRIAL APPLICABILITY

A SAR according to the present disclosure can shorten the time until a SAR image with blurring reduced by motion compensation is generated, which is suitable for observation of the earth's surface from a platform such as an aircraft, for example.

REFERENCE SIGNS LIST

1: SAR system, 2, 2A to 2D: SAR, 3: SAR sensor, 4: measurement sensor, 5: storage device, 5a: determination reference value storing unit, 5b: image storing unit, 5c: reference position storing unit, 5d: selection reference value storing unit, 5e: autofocus determination reference value storing unit, 5f, 5g: allowed time storing unit, 6: display device, 6a: display controlling unit, 6b: display unit, 20: data acquiring unit, 21: trajectory analyzing unit, 22, 22A: determining unit, 23, 23A to 23C: motion compensating unit, 24: image generating unit, 25, 25A: selecting unit, 26, 26A, 26B: autofocusing unit, 27, 27A: adjusting unit, 100: processing circuitry, 101: CPU, 102: memory, 103: platform

The invention claimed is:
1. A synthetic aperture radar comprising:
processing circuitry
to acquire observation data including reception signals of radio waves that are transmitted to an observation object from a moving platform and reflected by the observation object, transmission/reception times of the radio waves, and information indicating positions and attitudes of the platform;
to calculate information on a difference between a planned trajectory and an actual trajectory of the platform for each of the transmission/reception times of the radio waves on a basis of the acquired observation data;
to determine whether or not motion compensation is necessary for each of the reception signals of the radio waves on a basis of the calculated information on the difference;
to perform a motion compensation process on the reception signals of the radio waves for which motion compensation is determined to be necessary; and
to perform an image generation process on the reception signals of the radio waves on which the motion compensation process is performed and on the reception signals of the radio waves on which the motion compensation process is not performed in accordance with a result of the determination, to generate a synthetic aperture radar image of the observation object.

2. The synthetic aperture radar according to claim 1, wherein the processing circuitry is configured to define the planned trajectory in a three-dimensional space on a basis of the acquired observation data, and calculates a distance difference between a distance from a reference position set in the three-dimensional space to the actual trajectory and a distance from the reference position to the planned trajectory for each of the transmission/reception times of the radio waves, and determine whether or not the motion compensation is necessary for each of the reception signals of the radio waves, on a basis of the distance difference.

3. The synthetic aperture radar according to claim 2, wherein the processing circuitry is configured to determine whether or not the motion compensation is necessary for each of the reception signals of the radio waves, on a basis of a phase difference into which the distance difference is converted.

4. The synthetic aperture radar according to claim 3, wherein the processing circuitry is configured to determine whether or not the motion compensation is necessary for each of the reception signals of the radio waves on a basis of a coefficient of a polynomial function obtained by fitting the polynomial function to the phase difference.

5. The synthetic aperture radar according to claim 2, wherein the processing circuitry is configured to determine whether or not the motion compensation is necessary for each of the received radio wave signals, on a basis of a time differential of the distance difference.

6. The synthetic aperture radar according to claim 2, wherein the processing circuitry is configured to determine whether or not the motion compensation is necessary for each of the received radio wave signals, on a basis of a quadratic phase error calculated by using the distance difference.

7. The synthetic aperture radar according to claim 2, wherein the processing circuitry is configured to determine whether or not the motion compensation is necessary, on a basis of an azimuth resolution at each of reference positions calculated by using the distance difference.

8. The synthetic aperture radar according to claim 2, wherein the processing circuitry is further configured to perform an autofocusing process on a region generated from reception signals of the radio waves on which no compensation process is performed in the synthetic aperture radar image when a difference between a resolution obtained by measurement of the region and a resolution calculated by using the distance difference for the region is larger than a determination reference value.

9. The synthetic aperture radar according to claim 1, wherein the processing circuitry is further configured to adjust time to be taken for the motion compensation by changing the number of the reception signals of the radio waves on which the motion compensation process is to be performed among the reception signals of the radio waves for which the motion compensation is determined to be necessary, in such a manner that the time to be taken for the motion compensation will be within allowed time.

* * * * *